United States Patent
Ikawa et al.

(10) Patent No.: US 6,977,874 B2
(45) Date of Patent: Dec. 20, 2005

(54) APPARATUS AND METHOD FOR DRIVING CIRCUIT ELEMENTS BASED ON GROUPS OF INSTRUCTION VALUES

(75) Inventors: Yoshihiro Ikawa, Higashiosaka (JP); Yoshihiro Mushika, Neyagawa (JP); Teruyuki Takizawa, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 443 days.

(21) Appl. No.: 10/126,283

(22) Filed: Apr. 19, 2002

(65) Prior Publication Data

US 2003/0039185 A1 Feb. 27, 2003

(30) Foreign Application Priority Data

Apr. 20, 2001 (JP) .................................. 2001-122432

(51) Int. Cl.⁷ .............................................. G11B 7/095
(52) U.S. Cl. ................................. 369/44.32; 369/53.19
(58) Field of Search ..................... 369/44.32, 53.19, 369/53.28, 44.29, 44.41, 44.16, 44.34, 44.35, 44.25; 318/111, 112, 113, 293

(56) References Cited

U.S. PATENT DOCUMENTS

| | | | | |
|---|---|---|---|---|
| 5,467,328 A | * | 11/1995 | Murakami et al. | 369/44.16 |
| 5,475,661 A | * | 12/1995 | Tomita et al. | 369/53.28 |
| 5,724,337 A | * | 3/1998 | Kawano et al. | 720/674 |
| 6,134,058 A | * | 10/2000 | Mohri et al. | 369/44.15 |
| 6,181,670 B1 | * | 1/2001 | Nagasato | 720/681 |
| 6,480,460 B1 | * | 11/2002 | Ohkuma et al. | 369/44.16 |
| 6,643,229 B1 | * | 11/2003 | Yamaguchi | 369/53.19 |
| 2001/0028623 A1 | * | 10/2001 | Ijima et al. | 369/112.23 |

FOREIGN PATENT DOCUMENTS

| | | |
|---|---|---|
| JP | 07-065397 | 3/1995 |
| JP | 2001-273659 | 10/2001 |

\* cited by examiner

*Primary Examiner*—Brian E. Miller
*Assistant Examiner*—Peter Vincent Agustin
(74) *Attorney, Agent, or Firm*—Akin Gump Strauss Hauer & Feld, LLP

(57) ABSTRACT

A circuit element driver includes a control section and a driving section. The control section receives a number n of instruction values of a first group (where $n \geq 2$) and produces and outputs a number p of instruction values of a second group (where $(n+1) \leq p < 2n$) in accordance with the n instruction values of the first group. The instruction values of the first group are issued to generate voltages to be applied to n two-terminal circuit elements. The driving section generates and outputs p drive voltages in accordance with the p instruction values of the second group. At least one of the p drive voltages changes with at least one of the instruction values of the first group and is applied in common to two or more of the circuit elements at one terminal thereof.

35 Claims, 14 Drawing Sheets

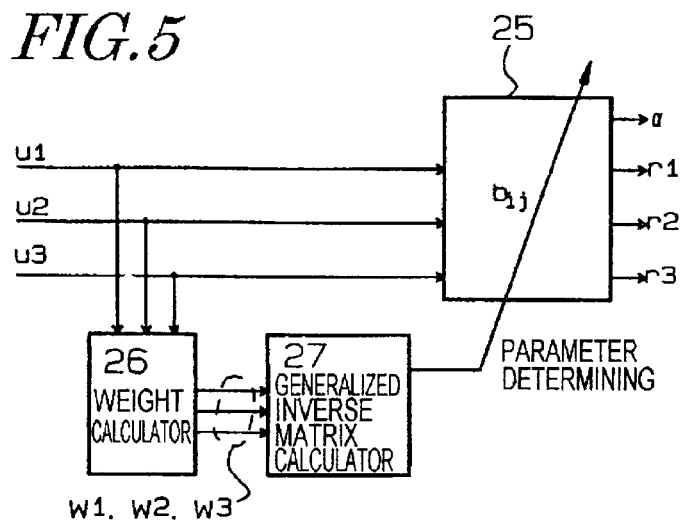

APPARATUS AND METHOD FOR DRIVING CIRCUIT ELEMENTS BASED ON GROUPS OF INSTRUCTION VALUES

BACKGROUND OF THE INVENTION

1. Field of the Invention

The present invention relates to an apparatus and method for driving circuit elements.

2. Description of the Related Art

To apply voltages to two-terminal circuit elements such as coils or resistors, two interconnections are needed for each of the circuit elements. For example, six interconnections are necessary to apply respective voltages to three coils independently.

A lens driver for use in an optical disk drive is one of such apparatuses for applying respective voltages to a plurality of two-terminal circuit elements independently. For example, according to the technique disclosed in Japanese Laid-Open Publication No. 7-65397, the tilt of the optical axis of an optical head with respect to a disk may be corrected by the tilt of an objective lens to be driven by a lens driver.

An apparatus like this drives the objective lens at three degrees of freedom and needs three types of coils. Specifically, this apparatus uses: a tracking coil for driving the objective lens in a tracking direction; a focus coil for driving the objective lens in a focus direction; and a tilt coil for driving the objective lens in such as manner as to tilt the lens with respect to the disk.

These coils are normally energized by way of four electrically conductive springs that support the objective lens thereon. For example, to drive the three coils independently, the tracking and focus coils may be energized by way of the four conductive springs, while the remaining tilt coil may be energized through a fine interconnecting wire that has been extended to an external circuit.

In such a connection, however, the interconnecting wire for energizing the tilt coil unintentionally constitutes a load on the four conductive springs that support the objective lens thereon, thus causing a variation in spring constants disadvantageously. Also, the additional process steps of connecting the interconnecting wire to the tilt coil and fixing the wire in such a manner that the wire places an equal load on the four conductive springs are needed.

This problem may be resolved by connecting the three coils together to a common terminal at one terminal thereof and assigning three interconnecting wires, connected to the those three terminals of the three coils, and one interconnecting wire, connected to the common terminal, to the four conductive springs. In that case, however, the maximum voltage that can be applied to those coils decreases to a half disadvantageously. This phenomenon will be described in further detail below.

Suppose three coils are driven by using a 5 V DC power supply to apply a supply voltage thereto. For example, three coils 102a, 102b and 102c may be connected to three switching elements 101a, 101b and 101c, respectively, as shown in FIG. 18. In that case, six interconnecting wires should be connected in total to the six terminals of the three coils 102a, 102b and 102c. If these switching elements 101a, 101b and 101c are turned ON or OFF so that each of the two terminals of every coil 102a, 102b or 102c may be connected to either the high-potential-level terminal 105H or low-potential-level terminal 105L of the power supply 105, then a voltage of –5 V to 5 V may be created between the two terminals of every coil 102a, 102b or 102c.

On the other hand, where the three coils 102a, 102b and 102c are connected together at one terminal thereof to a reference potential level as shown in FIG. 19, the three coils 102a, 102b and 102c should be connected at the other terminal thereof to switching elements 103a, 103b and 103c, respectively, so that the other terminal of each of the coils 102a, 102b and 102c may be connected to either the high-potential-level terminal 105H or the low-potential-level terminal 105L of the power supply 105. By providing the common terminal, the number of terminals needed to drive the three coils 102a, 102b and 102c decreases from six to four. In that case, however, if the low-potential-level terminal 105L of the power supply 105 is connected to the reference potential level as indicated by the dashed line 107 in FIG. 19, then the voltage that can be applied to each of the elements (i.e., the coils) is from 0 V to +5 V and the voltage cannot be applied in the reverse direction. To make the voltage applicable in the reverse direction also, the intermediate point of the power supply 105 should be connected to the reference potential level as indicated by the solid line 106 in FIG. 19. Then, the voltage that can be applied to each of the elements (i.e., the coils) is from –2.5 V to +2.5 V.

In this manner, if the three coils are driven by the lens driver with one terminal of each coil connected to the common terminal, then the maximum instantaneous voltage that can be applied to each of those coils decreases to one half. As a result, the thrust on the lens being driven by the coils decreases. For example, if a disk having a track eccentricity greater than its regular value is loaded into such a disk drive, then the thrust on the lens being driven will be short of its required level in the tracking direction. Also, if a disk having a fluttering value greater than its regular value is loaded into such a disk drive, then the thrust on the lens being driven will be short of its required level in the focus direction. In these situations, the disk drive cannot read information from such a disk correctly particularly when the information should be read from the disk at a speed several times as high as the normal one.

SUMMARY OF THE INVENTION

In order to overcome the problems described above, the present invention provides a circuit element driver that can drive a plurality of circuit elements independently without decreasing the maximum instantaneous voltage that can be applied to each of those circuit elements and with the number of interconnecting wires needed to drive the circuit elements reduced, and also provides a method for driving the circuit elements in that way.

A circuit element driver according to the present invention includes control means and driving means. The control means receives a number n of instruction values of a first group (where n is an integer equal to or greater than two) and produces and outputs a number p of instruction values of a second group (where p is an integer equal to or greater than (n+1) but less than 2n) in accordance with the n instruction values of the first group. The instruction values of the first group are issued to generate voltages to be applied to n two-terminal circuit elements. The driving means generates and outputs p drive voltages in accordance with the p instruction values of the second group. At least one of the p drive voltages changes with at least one of the instruction values of the first group and is applied in common to two or more of the circuit elements at one terminal thereof.

In one preferred embodiment of the present invention, the control means defines the instruction values of the second group in such a manner as to substantially minimize a performance index about the drive voltages.

In another preferred embodiment of the present invention, the control means produces the instruction values of the second group in such a manner as to substantially minimize differences between the voltages to be applied to the circuit elements in accordance with the instruction values of the first group and the drive voltages generated by the driving means.

In still another preferred embodiment, the control means includes linear matrix calculating means.

In this particular preferred embodiment, the linear matrix calculating means multiplies the n instruction values of the first group by a generalized inverse matrix having a size of p×n, thereby outputting the p instruction values of the second group.

More specifically, the generalized inverse matrix preferably minimizes a norm of the instruction values of the second group.

Alternatively, the generalized inverse matrix may minimize a norm of the instruction values of the second group that have been multiplied by a weighting factor.

In that case, the control means preferably changes the weighting factor in accordance with a history of the instruction values of the first group.

As an alternative, the weighting factor may be determined by using a norm about time of the instruction values of the first group.

In yet another preferred embodiment, the driving means includes: p duty changing means, each outputting a switching signal that changes its duty cycle in accordance with an associated one of the instruction values of the second group; and p switching driving means, each alternately outputting a maximum value or a minimum value of a supply voltage in response to associated one of the switching signals.

More particularly, the duty changing means preferably includes a microcomputer or a digital signal processor (DSP) and preferably outputs a signal, which has its bits at an input/output port inverted periodically through software-based timer processing using the microcomputer or the DSP, to the switching driving means.

In yet another preferred embodiment, each said instruction value of the first group is a periodic signal. In that case, at least one of the instruction values of the second group, which has been obtained beforehand through computation, is preferably stored in a predetermined storage medium, read out from the storage medium, and output to the driving means, synchronously with the instruction value of the first group.

In yet another preferred embodiment, n is three, p is four, and one of the four drive voltages is applied in common to the three two-terminal circuit elements at one terminal thereof.

In yet another preferred embodiment, p is an integer greater than n by one. In that case, the driving means preferably generates a number (n+1) of drive voltages to be applied to a common terminal and n individual terminals, respectively. One terminal of each of the n circuit elements is connected to the common terminal, while the other terminal of each said circuit element is associated one of the individual terminals. The control means preferably receives the n instruction values of the first group and outputs (n+1) instruction values of the second group to the driving means so that the driving means generates the (n+1) drive voltages.

In this particular preferred embodiment, each said circuit element is identified by a number k, which is an integer falling within a range from one to n. In that case, the control means includes: maximum value detecting means for detecting a maximum value $u_{max}$ of the n instruction values $u_k$ of the first group; and minimum value detecting means for detecting a minimum value $u_{min}$ of the n instruction values $u_k$ of the first group. The control means produces the instruction value α of the second group by using at least the $u_{max}$ and the $u_{min}$. The instruction value α is used to generate the drive voltage to be applied to the common terminal. The control means adds the instruction value α of the second group to each of the n instruction values $u_k$ of the first group, thereby generating n instruction values $r_k$ of the second group to be applied to the respective individual terminals.

More particularly, the control means preferably outputs an inverted average of the maximum and minimum values $u_{max}$ and $u_{min}$ as the instruction value α of the second group.

In yet another preferred embodiment, the driving means includes a nonlinear function that has a non-saturated range in which the drive voltages are generated in proportion to the instruction values of the second group and a saturated range in which a constant drive voltage is generated irrespective of the instruction values of the second group. The control means calculates the (n+1) instruction values of the second group from the n instruction values of the first group in accordance with a nonlinear relationship. Each said circuit element is identified by a number k, which is an integer falling within a range from one to n. In that case, the control means preferably includes output shortage calculating means for providing surpluses of the n instruction values $u_k$ of the first group over the non-saturated range as n output shortages $s_k$ if the (n+1) instruction values of the second group are greater than a maximum value of the non-saturated range or smaller than a minimum value of the non-saturated range. The control means preferably produces the instruction value α of the second group to be supplied to the common terminal by using at least one of the n output shortages $s_k$, and produces the n instruction values $r_k$ of the second group to be supplied to the individual terminals by adding the instruction value α of the second group to each of the n instruction values $u_k$ of the first group.

In this particular preferred embodiment, the control means uses a performance index that includes the n output shortages $s_k$ as respective arguments and determines the instruction value α of the second group in such a manner as to minimize the performance index.

More particularly, the performance index is preferably used to output a maximum value of the output shortages $s_k$.

Alternatively, the performance index may have been weighted by a weighting factor $w_k$.

Specifically, the instruction value α of the second group is preferably determined by performing the steps of: obtaining multiple candidates $α_{ij}$ of the instruction value α of the second group by a predetermined equation that uses an instruction value $u_i$ of the first group of an $i^{th}$ one of the circuit elements and an instruction value $u_j$ of the first group of a $j^{th}$ one of the circuit elements, $u_i$ and $u_j$ having mutually opposite signs; and selecting one of the candidates $α_{ij}$, which minimizes the performance index, as the instruction value α of the second group.

In this particular preferred embodiment, the predetermined equation for obtaining the candidates $α_{ij}$ is represented as $$\alpha_{ij} = \frac{q(w_i - w_j) - (w_i|u_i| - w_j|u_j|)}{(w_i sgn(u_i) - w_j sgn(u_j))}, \ (i \neq j \wedge sgn(u_i) sgn(u_j) = -1)$$

by using the weighting factor $w_k$, a predetermined constant q and a signum function sgn(x) defined by $$sgn(x) = \begin{cases} -1, & (x < 0) \\ 0, & (x = 0) \\ 1, & (x > 0) \end{cases}$$

In yet another preferred embodiment, a norm of the output shortages $s_k$ is used for the performance index.

In that case, the instruction value α of the second group is preferably determined by performing the steps of: obtaining multiple initial value candidates $\alpha_{ij}$ by a predetermined equation that uses an instruction value $u_i$ of the first group of an $i^{th}$ one of the circuit elements and an instruction value $u_j$ of the first group of a $j^{th}$ one of the circuit elements, $u_i$ and $u_j$ having mutually opposite signs; selecting an initial value $\alpha_0$ that minimizes the performance index from the initial value candidates $\alpha_{ij}$ by a first iterative procedure; and searching for the instruction value α of the second group that minimizes the performance index by a second iterative procedure that starts at the initial value $\alpha_0$ and uses α=0 as an initial search direction.

In yet another preferred embodiment, the control means further includes: maximum value detecting means for detecting a maximum value $S_{max}$ of the n output shortages $s_k$; and minimum value detecting means for detecting a minimum value $S_{min}$ of the n output shortages $s_k$. The control means produces the instruction value α of the second group to be supplied to the common terminal by using at least the maximum and minimum values $S_{max}$ and $S_{min}$.

In this particular preferred embodiment, an inverted sum of the maximum and minimum values $S_{max}$ and $S_{min}$ is preferably output as the instruction value α of the second group.

Another circuit element driver according to the present invention includes control means and driving means. The control means receives a number n of instruction values of a first group (where n is an integer equal to or greater than two) and produces and outputs a number p of instruction values of a second group (where p is an integer equal to or greater than (n+1) but less than 2n) in accordance with the n instruction values of the first group. The instruction values of the first group are issued to generate voltages to be applied to n two-terminal circuit elements. The driving means generates and outputs p drive voltages in accordance with the p instruction values of the second group. The control means produces one of the instruction values of the second group which corresponds to the drive voltage to be applied to a common terminal formed by commonly connecting terminals of two or more of the circuit elements, in accordance with at least one of the instruction values of the first group.

In one preferred embodiment of the present invention, the control means produces other instruction values of the second group which corresponds to the drive voltages to be applied to respective individual terminals that are not connected to the common terminal of the two or more of the circuit elements, in accordance with the at least one instruction value of the first group.

A disk drive according to the present invention includes: the circuit element driver according to any of the preferred embodiments of the present invention described above; and a lens driver that includes an objective lens, a tracking coil, a focus coil and a tilt coil.

In one preferred embodiment of the present invention, the disk drive further includes: a conductive elastic member, which is connected in common to the tracking, focus and tilt coils at one terminal thereof; and three conductive elastic members, which are respectively connected to the tracking, focus and tilt coils at the other terminal thereof.

The present invention also provides a method for driving a number n of two-terminal circuit elements in accordance with n instruction values, where n is an integer equal to or greater than two. The method includes the step of a) generating n drive voltages and one common drive voltage. The n drive voltages change in accordance with the n instruction values, while the common drive voltage changes in accordance with at least one of the n instruction values. The method further includes the steps of b) applying the common drive voltage in common to the n circuit elements at one terminal thereof and c) applying the n drive voltages to the n circuit elements, respectively, at the other terminal thereof.

In one preferred embodiment of the present invention, the step a) includes the step of generating the common drive voltage from maximum and minimum values of the n instruction values.

In another preferred embodiment of the present invention, the step a) includes the step of determining the n drive voltages and the common drive voltage in such a manner as to substantially minimize a difference between the drive voltage to be applied to each said circuit element in accordance with associated one of the instruction values and a potential difference created between the two terminals of the circuit element.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 5 is a block diagram illustrating a configuration for a parameter defining section that defines the parameters of the linear matrix calculating section of the circuit element driver shown in FIG. 4.

DETAILED DESCRIPTION OF PREFERRED EMBODIMENTS

Embodiment 1

Figure 1:
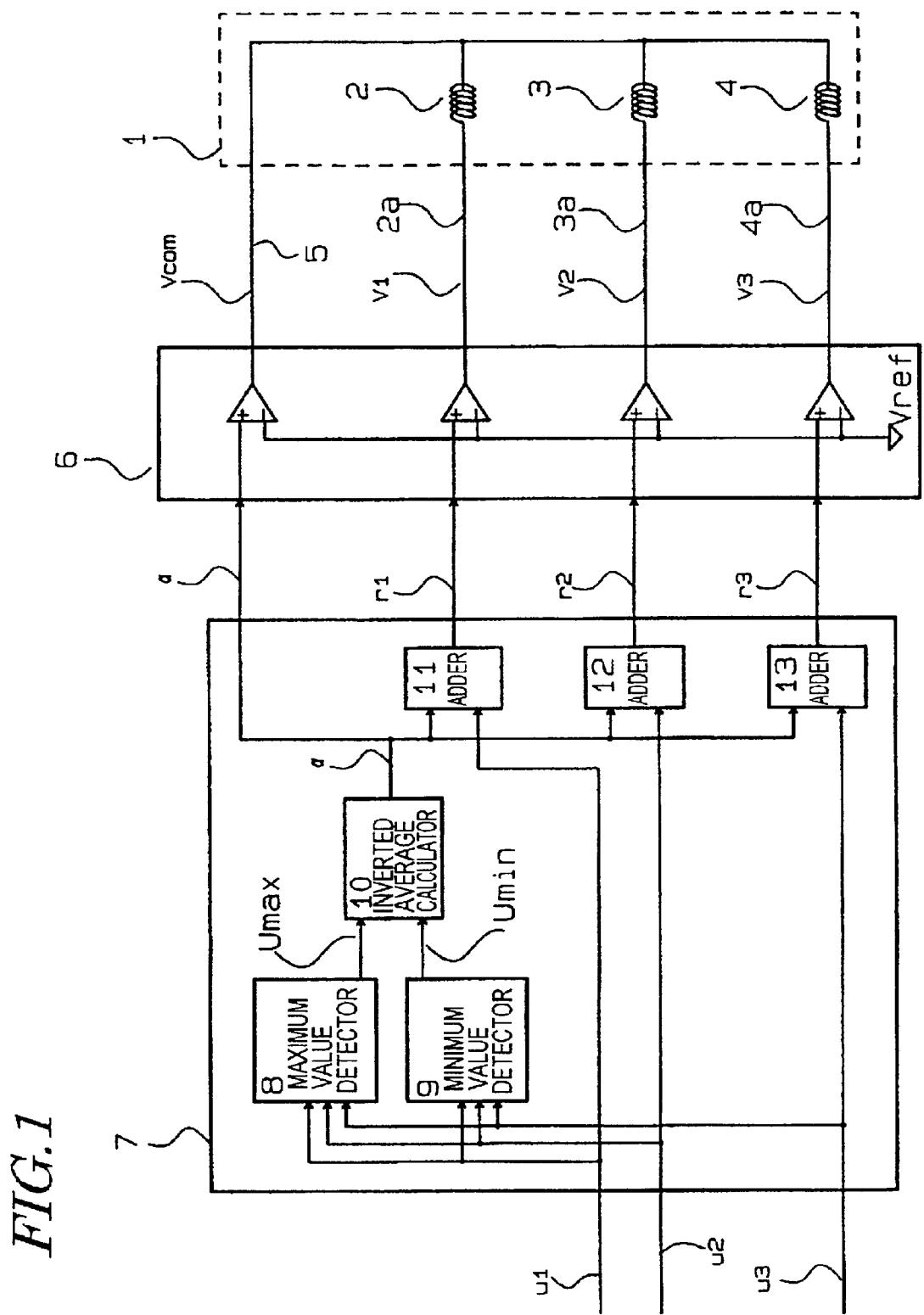
FIG. 1 is a block diagram illustrating a circuit element driver according to a first specific preferred embodiment of the present invention.

A circuit element driver according a first specific preferred embodiment of the present invention will be described with reference to FIGS. 1 and 2. FIG. 1 is a block diagram illustrating the circuit element driver of the first preferred embodiment.

The circuit element driver of this preferred embodiment drives a spindle motor 1. The spindle motor 1 includes three coils 2, 3 and 4 as respective two-terminal circuit elements. These coils 2, 3 and 4 are connected together to a common terminal 5 at one terminal thereof and to individual terminals 2a, 3a and 4a at the other terminal thereof, respectively. The common terminal 5 and individual terminals 2a, 3a and 4a have been extended from the spindle motor 1. That is to say, four terminals have been extended for three coils.

The circuit element driver of this preferred embodiment includes a driving section 6 and a control section 7. The driver receives voltage instruction values $u_1$, $u_2$ and $u_3$ as instruction values of a first group and outputs voltages $V_{com}$, $V_1$, $V_2$ and $V_3$ as drive voltages to be applied to the common terminal 5 and individual terminals 2a, 3a and 4a, respectively.

The voltage instruction values $u_1$, $u_2$ and $u_3$ include information about the voltages to be applied to the coils 2, 3 and 4, respectively. On receiving the voltage instruction values $u_1$, $u_2$ and $u_3$ the control section 7 performs a predetermined computation on these voltage instruction values to produce a common instruction value α and corrected instruction values $r_1$, $r_2$ and $r_3$ as instruction values of the second group based on the result of the computation. Then, the driving section 6 receives the common instruction value α and corrected instruction values $r_1$, $r_2$ and $r_3$, thereby generating the voltages $V_{com}$, $V_1$, $V_2$ and $V_3$ from these instruction values and applying these voltages to the common terminal 5 and individual terminals 2a, 3a and 4a, respectively.

In a predetermined part of the range that the instruction values of the second group can cover, each of the drive voltages is proportional to its associated instruction value of the second group. Suppose an instruction value of the second group falls within a range from −1.0 to +1.0 and that part of the range in which its associated drive voltage is proportional to the instruction value is from −0.5 to +0.5 (which particular part of the range will be herein referred to as a "drive voltage proportional range"). In this drive voltage proportional range, the drive voltage is supposed to be from the minimum to the maximum value of the supply voltage to be applied to the driving section 6. In that case, if the corrected instruction value $r_1$ is zero, the voltage $V_1$ to be output is equal to a half of the supply voltage. More specifically, if the power supply is a unidirectional power supply for applying a supply voltage of 0 V to +5 V, a voltage $V_1$ of 2.5 V is output in response to a corrected instruction value $r_1$ of zero.

The driving section 6 cannot output any voltage exceeding the supply voltage range of the power supply. In other words, the range of the voltages that the driving section 6 can output is limited to the supply voltage range of the power supply. Accordingly, if the corrected instruction value $r_1$ is +0.5 or more, then the maximum supply voltage of +5 V is output from the driving section 6. Conversely, if the corrected instruction value $r_1$ is −0.5 or less, then the minimum supply voltage of 0 V is output from the driving section 6. That is to say, when the absolute value of the corrected instruction value $r_1$ is greater than 0.5, the output voltage is saturated. The relationship between the corrected instruction value $r_1$ and the voltage $V_1$ described above is also satisfied between any other instruction value of the second group and its associated drive voltage.

In the following description, k will be herein supposed to include the three integers of 1, 2 or 3 indicating the numbers of the respective circuit elements, the instruction values of which will also be identified by this k subscript. For example, the voltage instruction values as the instruction values of the first group will be herein labeled collectively as "$u_k$", which includes the three instruction values $u_1$, $u_2$ and $u_3$. In the same way, the instruction values of the second group and the drive voltages will be herein collectively identified by "$r_k$" and "$V_k$", respectively.

Hereinafter, a specific configuration for the control section 7 will be described. As shown in FIG. 1, the control section 7 includes maximum value detector 8, minimum value detector 9, inverted average calculator 10 and adders 11, 12 and 13. The maximum value detector 8 detects the maximum value $u_{max}$ of the voltage instruction values $u_k$, while the minimum value detector 9 detects the minimum value $u_{min}$ of the voltage instruction values $u_k$. The maximum and minimum values $u_{max}$ and $u_{min}$ detected are input to the inverted average calculator 10. The inverted average calculator 10 gets the average of the maximum and minimum values $u_{max}$ and $u_{min}$, inverts the sign of the average and then outputs the inverted average as the common instruction value α. That is to say, the inverted average calculator 10 outputs the common instruction value α given by the following Equation (1):

$$\alpha = -\frac{u_{max} + u_{min}}{2} \quad (1)$$

The adders 11, 12 and 13 receive the voltage instruction values $u_1$, $u_2$ and $u_3$ and adds the common instruction value $\alpha$ to the voltage instruction values $u_1$, $u_2$ and $u_3$, thereby outputting the corrected instruction values $r_1$, $r_2$ and $r_3$, respectively. That is to say, the adders 11, 12 and 13 output the corrected instruction values $r_k$ given by the following Equation (2):

$$r_k = u_k + \alpha \quad (2)$$

The conventional circuit element driver applies a voltage, fixed at the intermediate value of the supply voltage, to the common terminal. That is to say, the voltage applied to the common terminal does not change in the prior art. In contrast, the circuit element driver according to this preferred embodiment of the present invention applies a variable voltage to the common terminal 5, thereby driving the common terminal dynamically. Therefore, the present invention is partly characterized by this method of controlling the common terminal 5. Hereinafter, it will be described in further detail how the circuit element driver having such a configuration operates. In the following illustrative example, each of the coils 2, 3 and 4 of the spindle motor 1 is driven by supplying a sine wave thereto.

Figure 2:
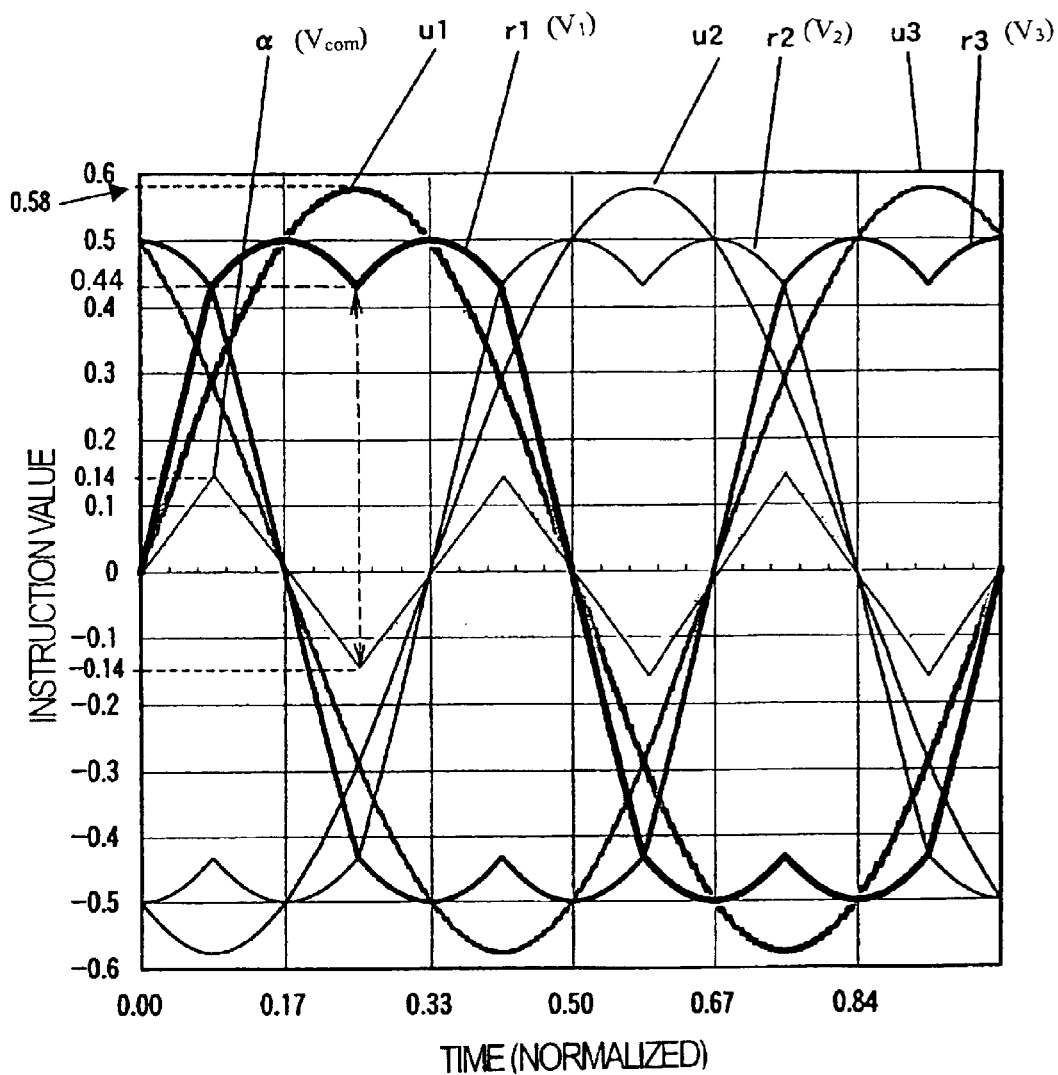
FIG. 2 is a graph showing the waveforms to illustrate how the circuit element driver shown in FIG. 1 operates.

FIG. 2 shows the first group of instruction values to be received by the control section 7 of the circuit element driver and the second group of instruction values to be output from the control section 7. In FIG. 2, the abscissa represents the time, which has been normalized so that one motor driving period equals one, and the ordinate represents the magnitude of the voltage instruction values $u_k$, corrected instruction values $r_k$ and common instruction value $\alpha$ and have also been normalized. Specifically, the voltage instruction value $u_1$ is a sine wave having a maximum amplitude of 0.58, the voltage instruction value $u_2$ is a sine wave delayed from the voltage instruction value $u_1$ for a time of ⅓, and the voltage instruction value $u_3$ is a sine wave delayed from the voltage instruction value $u_2$ for a time of ⅓.

As shown in FIG. 1, the maximum and minimum value detectors 8 and 9 each receive the voltage instruction values $u_1$, $u_2$ and $u_3$ and respectively output the maximum and minimum values $u_{max}$ and $u_{min}$ to the inverted average calculator 10. The inverted average calculator 10 outputs the common instruction value $\alpha$ given by Equation (1). As shown in FIG. 2, the common instruction value $\alpha$ is a triangular wave that has a period one-third as long as that of the voltage instruction values $u_k$ and that has a maximum amplitude of 0.14.

The adders 11, 12 and 13 respectively add the common instruction value $\alpha$ to the voltage instruction values $u_k$, thereby outputting the sums as the corrected instruction values $r_k$ given by Equation (2). As shown in FIG. 2, the corrected instruction values $r_k$ are substantially trapezoidal waves that have a deformed peak of a sine wave. The corrected instruction values $r_1$, $r_2$ and $r_3$ are shifted from each other by a time of ⅓ and have an amplitude of no greater than ±0.5.

The common instruction value $\alpha$ and corrected instruction values $r_1$, $r_2$ and $r_3$, which have been produced in this manner, are input to the driving section 6 shown in FIG. 1, which generates voltages $V_{com}$, $V_1$, $V_2$ and $V_3$ as drive voltages proportional to these instruction values, respectively. For example, values that are five times as great as the common and corrected instruction values shown in FIG. 2 are output as the voltages $V_{com}$, $V_1$, $V_2$ and $V_3$ from the driving section 6.

As shown in FIG. 2, as the common instruction value $\alpha$ falls within a range from −0.14 to +0.14, the voltage $V_{com}$ is from −0.7 V to +0.7 V. As the corrected instruction values $r_1$, $r_2$ and $r_3$ fall within a range from −0.5 to +0.5, the voltages $V_1$, $V_2$ and $V_3$ are all from −2.5 V to +2.5 V. All of these values are equal to or smaller than the intermediate value of the supply voltage.

As shown in FIG. 1, the voltage applied to the coil 2 is a potential difference between the common terminal 5 and the individual terminal 2a. The voltage applied to the coil 3 is a potential difference between the common terminal 5 and the individual terminal 3a. And the voltage applied to the coil 4 is a potential difference between the common terminal 5 and the individual terminal 4a. As shown in FIG. 2, it is when the common instruction value $\alpha$ is −0.14 and the corrected instruction value $r_1$ is 0.44 that the voltages applied to the coils 2, 3 and 4 are maximized. At that time, the voltages $V_{com}$ and $V_1$ are −0.7 V and 2.2 V, respectively. Thus, a voltage of 2.9 V is applied to the coil 2. Accordingly, a sine wave with the amplitude of 2.9 V is applied to the coil 2 with the passage of time. That is to say, the maximum and minimum voltages to be applied to the coil 2 are +2.9 V and −2.9 V, respectively. In the same way, the potential differences created between the two terminals of the coils 3 and 4 (i.e., the voltages applied to the coils 3 and 4) are also from −2.9 V to +2.9 V.

In the conventional driving method in which the common terminal is fixed at the intermediate value of the supply voltage, the maximum voltage applicable is 2.5 V as described above. In contrast, according to this preferred embodiment, a voltage of 2.9 V can be applied. Thus, the maximum voltage applicable can be increased by as much as 16%. This is because the common instruction value $\alpha$ is not constant but variable as shown in FIG. 2. In other words, a variable voltage $V_{com}$, which is obtained in accordance with the common instruction value $\alpha$, is applied to the common terminal 5. Accordingly, even if the voltages applied to the individual terminals 2a, 3a and 4a are not greater than the intermediate value of the supply voltage, voltages greater than the intermediate value of the supply voltage still can be applied to the coils 2, 3 and 4 as circuit elements. This is because a voltage, having a sign opposite to that of the voltage applied to the individual terminal 2a, may be applied to the common terminal 5 in that situation.

That is to say, in this preferred embodiment, the coils 2, 3 and 4 are driven by generating the voltages $V_1$, $V_2$, $V_3$ and $V_{com}$ changing with the voltage instruction values $u_k$, applying the voltage $V_{com}$ to the common terminal 5 connected in common to the coils 2, 3 and 4 at one terminal thereof, and applying the voltages $V_1$, $V_2$ and $V_3$ to the individual terminals 2a, 3a and 4a that are the other terminals of the coils 2, 3 and 4, respectively. By connecting these three coils in common to the common terminal 5 at one terminal thereof, the number of terminals or interconnecting wires to be connected to the three coils can be reduced. Also, since the coils 2, 3 and 4 are driven with a variable voltage applied to the common terminal 5, it is possible to prevent the maximum voltage applicable to each of these coils from being decreased.

In the preferred embodiment described above, the voltage instruction values $u_1$, $u_2$ and $u_3$ have their phases shifted from each other by one-third period. However, if these voltage instruction values $u_1$, $u_2$ and $u_3$ are in phase with each other, the maximum voltage applicable to each of those coils may be set equal to 5 V.

Also, if instruction values given to drive circuit elements have periodical waveforms as in driving the coils of a spindle motor, the common instruction value α also has a periodical waveform. Furthermore, the amplitude of the common instruction value α is proportional to that of the voltage instruction values $u_k$. Accordingly, if the common instruction values α for one period are stored on a memory and read out therefrom in accordance with the voltage instruction values $u_k$, no calculation is needed. In that case, the time and power to be consumed for the computation can be saved.

In the circuit element driver according to the preferred embodiment described above, the driving section 6, control section 7 and their respective components (e.g., the maximum value detector 8) may be implemented as known electronic circuits each made up of conventional electronic components. Alternatively, the functions performed by these circuits and components may also be implementable by means of software-based signal processing using a microcomputer or digital signal processor (DSP).

Embodiment 2

Figure 3:
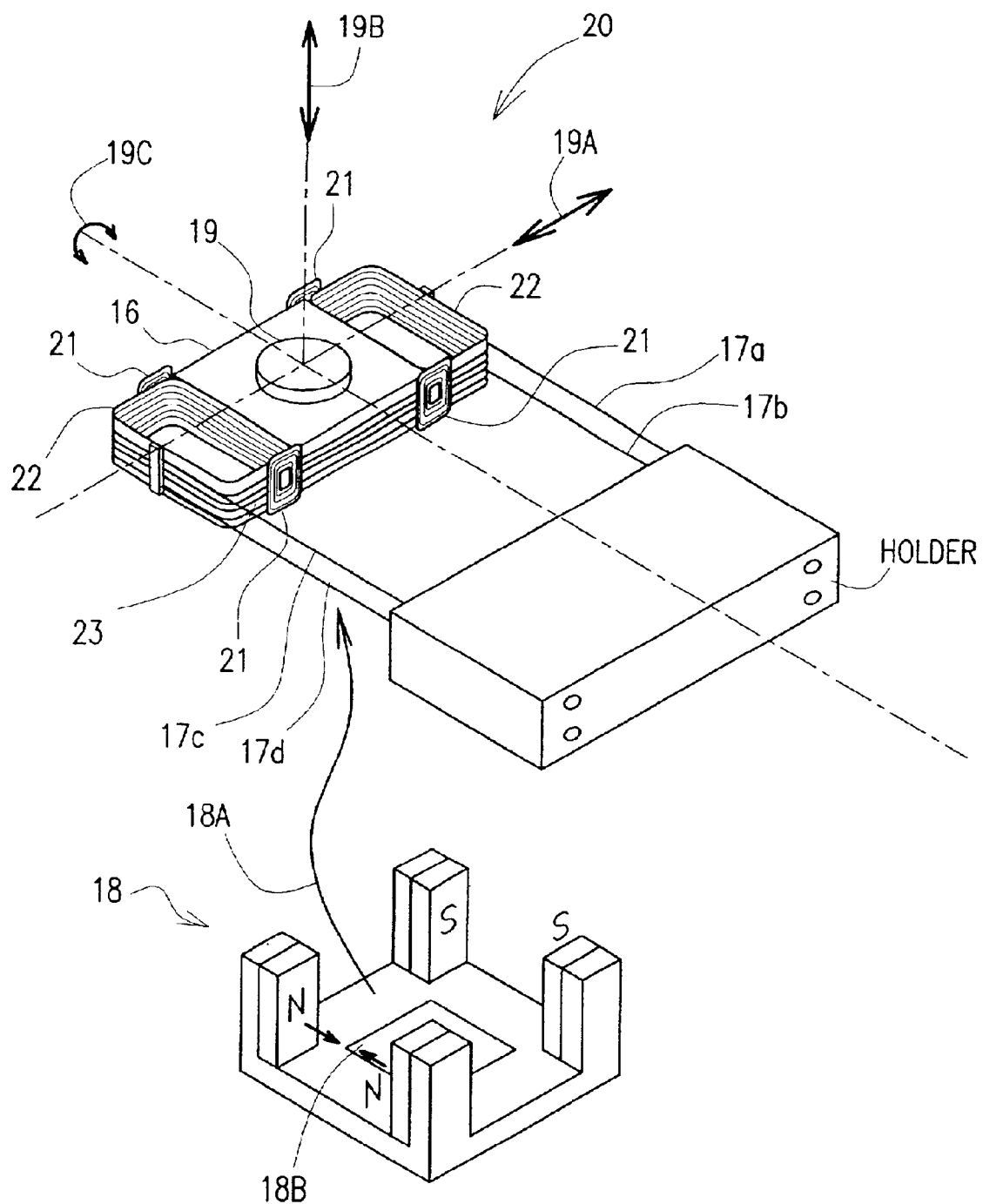
FIG. 3 is a perspective view illustrating a lens driver to be driven by a circuit element driver according to a second specific preferred embodiment of the present invention.

Hereinafter, a circuit element driver according to a second specific preferred embodiment of the present invention will be described. The second preferred embodiment to be described below relates to a disk drive including a lens driver and a circuit element driver for use to control the lens driver. FIG. 3 illustrates a lens driving section 20 of a lens driver. As shown in FIG. 3, the lens driving section 20 includes lens 19, tracking coils 21, focus coils 22 and tilt coil 23. The lens 19 is held by a lens holder 16 and the tracking, focus and tilt coils 21, 22 and 23 are fixed to the lens holder 16. The tracking coils 21 actually include four coils that are connected in series together and the focus coils 22 actually include two coils that are also connected in series together.

These three types of coils 21, 22 and 23 are connected in common to a conductive elastic member 17a at one terminal thereof. The tracking coils 21, focus coils 22 and tilt coil 23 are respectively connected to conductive elastic members 17b, 17c and 17d at the other terminal thereof. The conductive elastic members 17b, 17c and 17d supply electrical power to these coils 21, 22 and 23 and support the lens driving section 20 elastically. In this preferred embodiment, the conductive elastic members are wires. Alternatively, the conductive elastic members may also be leaf springs with electrical conductivity, springs in any other shape or other non-spring elastic members with electrical conductivity.

The lens driving section 20 is inserted into, and held inside, the space 18B of a magnetic circuit 18. When a current flows through the three types of coils 21, 22 and 23 by way of the conductive elastic members 17b, 17c and 17d, attraction or repulsion is caused between the magnetic fields generated from the coils and the magnetic fields generated from magnets included in the magnetic circuit 18. As a result, the lens driving section 20 moves in a predetermined direction. Specifically, when current flows through the tracking coils 21, the lens driving section 20 moves in the direction indicated by the arrow 19A. On the other hand, when current flows through the focus coils 22 or tilt coil 23, the lens driving section 20 moves in the direction indicated by the arrow 19B or 19C, respectively. A lens driver of this type is disclosed in Japanese Laid-Open Publication No. 7-65397, for example.

Figure 4:
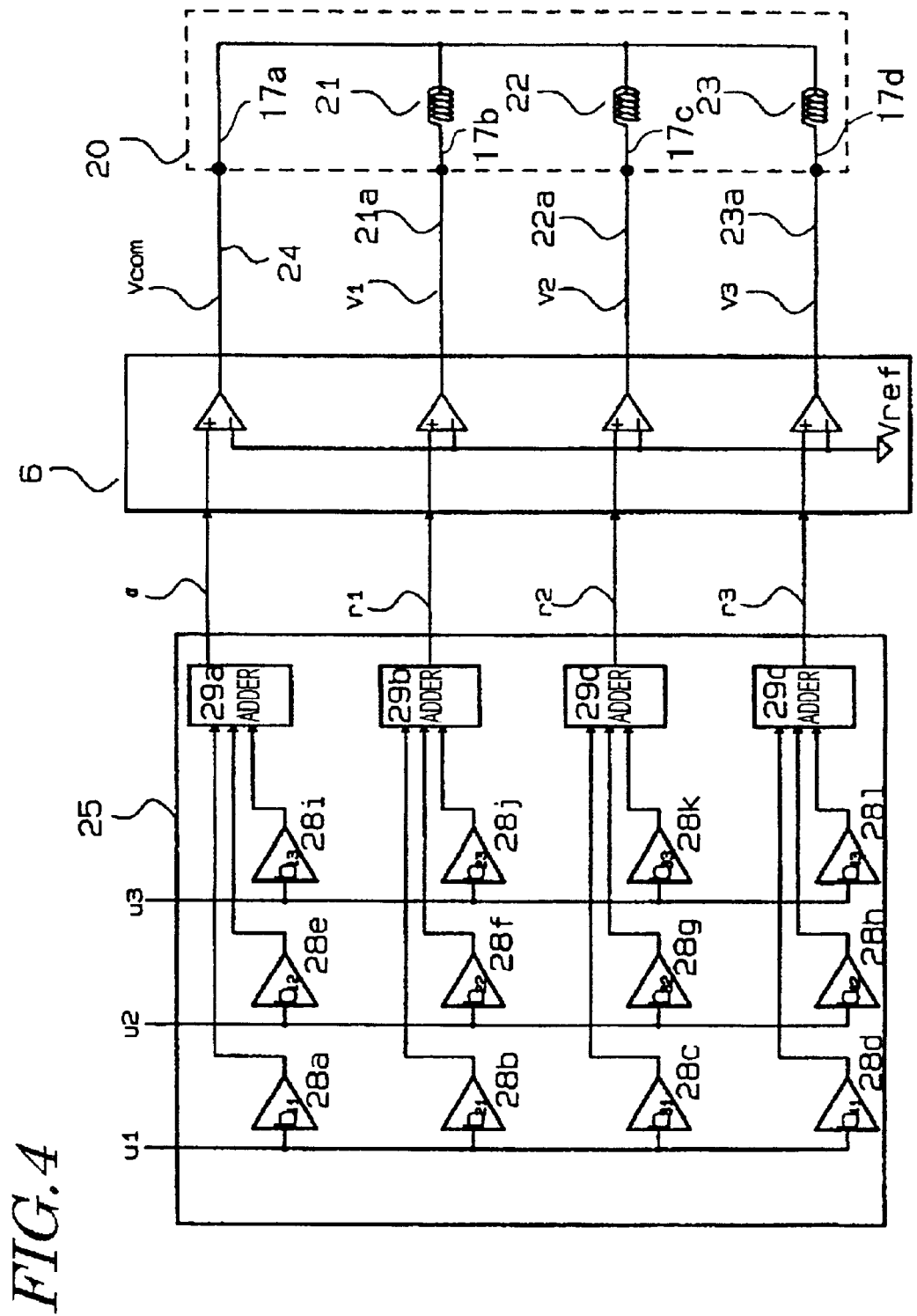
FIG. 4 is a block diagram illustrating the circuit element driver of the second preferred embodiment for use to drive the lens driver shown in FIG. 3.

FIG. 4 illustrates a circuit element driver for use to drive the lens driving section 20 shown in FIG. 3. In FIG. 4, the conductive spring 17a, which is connected in common to the tracking, focus and tilt coils 21, 22 and 23 of the lens driving section 20, is connected to a common terminal 24. On the other hand, the conductive springs 17b, 17c and 17d are connected to individual terminals 21a, 22a and 23a, respectively.

The circuit element driver of this preferred embodiment includes the driving section 6 and a linear matrix calculating section 25 as a control section. As in the first preferred embodiment described above, the circuit element driver of this second preferred embodiment also receives the voltage instruction values $u_1$, $u_2$ and $u_3$ as instruction values of a first group and then outputs the voltages $V_{com}$, $V_1$, $V_2$ and $V_3$ as the drive voltages to be applied to the common terminal 24 and individual terminals 21a, 22a and 23a, respectively.

The voltage instruction values $u_1$, $u_2$ and $u_3$ include information about the voltages to be applied to the tracking, focus and tilt coils 21, 22 and 23, respectively. As in the first preferred embodiment described above, on receiving the voltage instruction values $u_1$, $u_2$ and $u_3$, the linear matrix calculating section 25 performs a predetermined computation on these voltage instruction values, thereby producing a common instruction value α and corrected instruction values $r_1$, $r_2$ and $r_3$ as instruction values of a second group. Then, the driving section 6 receives the common instruction value α and corrected instruction values $r_1$, $r_2$ and $r_3$, thereby generating the voltages $V_{com}$, $V_1$ $V_2$ and $V_3$ in accordance with these instruction values and applying these voltages to the common terminal 24 and individual terminals 21a, 22a and 23a, respectively.

The range of the voltages that the driving section 6 can output is limited by the range of the supply voltage. Specifically, when the absolute value of the common instruction value α or the corrected instruction value $r_1$, $r_2$ or $r_3$ exceeds 0.5, the output voltage is saturated. Unless the output voltage is saturated, the voltages applied to the coils 21, 22 and 23 are given by the following Equation (3):

$$\begin{pmatrix} V_1 - V_{com} \\ V_2 - V_{com} \\ V_3 - V_{com} \end{pmatrix} = E \times \begin{pmatrix} -1 & 1 & 0 & 0 \\ -1 & 0 & 1 & 0 \\ -1 & 0 & 0 & 1 \end{pmatrix} \begin{pmatrix} \alpha \\ r_1 \\ r_2 \\ r_3 \end{pmatrix} \quad (3)$$

where E is a constant defined by the supply voltage. If the power supply is a unidirectional power supply that can supply voltages of 0 V to +5 V, E=5 V. On the other hand, if the power supply is a bidirectional power supply that can supply voltages of −5 V to 5 V, E=10 V. The left side of Equation (3) represents the potential differences created between the two terminals of the three coils 21, 22 and 23. The matrix of Equation (3) is defined by how the three coils are interconnected to the driving section 6. In this case, the interconnection is defined so that the voltages applied to the three coils 21, 22 and 23 are controllable independently. The matrix defined by those interconnections is herein represented as matrix A given by the following Equation (4):

$$A = \begin{pmatrix} -1 & 1 & 0 & 0 \\ -1 & 0 & 1 & 0 \\ -1 & 0 & 0 & 1 \end{pmatrix} \quad (4)$$

Next, an exemplary configuration for the linear matrix calculating section 25 will be described. The linear matrix calculating section 25 produces and outputs the common instruction value α and corrected instruction values $r_1$, $r_2$ and $r_3$ in accordance with the voltage instruction values $u_1$, $u_2$ and $u_3$. More specifically, as represented by the following Equations (5), the linear matrix calculating section 25 multiplies the three input signals $u_1$, $u_2$ and $u_3$ by a 4×3 matrix B, thereby producing the four output signals $\alpha$, $r_1$, $r_2$ and $r_3$.

$$\begin{pmatrix} \alpha \\ r_1 \\ r_2 \\ r_3 \end{pmatrix} = B \times \begin{pmatrix} u_1 \\ u_2 \\ u_3 \end{pmatrix} \quad (5)$$

$$B = \begin{pmatrix} b_{11} & b_{12} & b_{13} \\ b_{21} & b_{22} & b_{23} \\ b_{31} & b_{32} & b_{33} \\ b_{41} & b_{42} & b_{43} \end{pmatrix}$$

The computation represented by Equations (5) is carried out by multipliers 28a through 28l and adders 29a through 29d as shown in FIG. 4. For example, the common instruction value $\alpha$ is obtained by inputting the voltage instruction values $u_1$, $u_2$ and $u_3$ to the multipliers 28a, 28e and 28i, respectively, multiplying these values $u_1$, $u_2$ and $u_3$ by weights $b_{11}$, $b_{12}$ and $b_{13}$, respectively, and then adding the resultant products up at the adder 29a.

Next, it will be described how to define the twelve parameters $b_{11}$, $b_{12}$, $b_{13}$, $b_{21}$, $b_{22}$, $b_{23}$, $b_{31}$, $b_{32}$, $b_{33}$, $b_{41}$, $b_{42}$ and $b_{43}$ of the matrix B. FIG. 5 is a block diagram illustrating a configuration for a parameter defining section that defines parameters for the linear matrix calculating section 25. In FIG. 5, the linear matrix calculating section 25 has the same configuration as the counterpart illustrated in FIG. 4. The parameter defining section includes a weight calculator 26 and a generalized inverse matrix calculator 27. The weight calculator 26 receives the voltage instruction values $u_1$, $u_2$ and $u_3$ and calculates the weights of these voltage instruction values by reference to the history of the voltage instruction values. Specifically, if a past voltage instruction value has great amplitude, then the voltage instruction value may be regarded as an important signal for the system. In this preferred embodiment, a norm value with respect to time is adopted as a measure for determining the weight of a voltage instruction value. For example, the $\infty$ norm of a voltage instruction value as given by the following Equation (6) may be used as a measure for determining the weight. The $\infty$ norm corresponds to the maximum amplitude of a signal.

$$w_k = \sup_t |u_k(t)| \quad (6)$$

where k=1, 2 and 3. The weight calculator 26 outputs the weights $w_k$, obtained by Equation (6), to the generalized inverse matrix calculator 27. Using a weight matrix R including the weights $w_k$ as parameters, the generalized inverse matrix calculator 27 calculates the matrix B for the linear matrix calculator 25 in the following manner. First, the generalized inverse matrix calculator 27 defines the weight matrix R by the following Equation (7):

$$R = \begin{pmatrix} 0.5 & 0 & 0 & 0 \\ 0 & w_1 & 0 & 0 \\ 0 & 0 & w_2 & 0 \\ 0 & 0 & 0 & w_3 \end{pmatrix} \quad (7)$$

Next, by using this weight matrix R, the generalized inverse matrix calculator 27 performs the calculation given by the following Equations (8), thereby deriving the matrix B.

$$B = R^{-1} A^T (A R^{-1} A^T)^{-1}$$

$$R^{-1} = \begin{pmatrix} 2 & 0 & 0 & 0 \\ 0 & 1/w_1 & 0 & 0 \\ 0 & 0 & 1/w_2 & 0 \\ 0 & 0 & 0 & 1/w_3 \end{pmatrix} \quad (8)$$

where the superscript T of the matrix A represents a transpose. In this manner, the matrix B generated by the generalized inverse matrix generator 27 is used in the linear matrix calculating section 25. The values of the matrix B used in the linear matrix calculating section 25 are updated appropriately.

The matrix B given by Equations (8) minimizes the norm of the instruction values to be input to the driving section 6. That is to say, the matrix B minimizes the performance index J given by the following Equation (9):

$$J = \sqrt{0.5 \cdot \alpha^2} \sqrt{1 + w_1(r_1)^{2 + w_{2(2)}}} \quad (9)$$

As for the weight of the common instruction value $\alpha$, a standard value is appropriately selected by the designer. The smaller the variable J of this performance index given by Equation (9), the smaller the instruction values output to the driving section 6. As a result, the output saturation is minimized.

That is to say, the performance index given by Equation (9) determines the magnitude of the voltages to be output from the driving section 6. Thus, when this performance index given by Equation (9) is minimized, the differences between the voltages to be generated in accordance with the voltage instruction values $u_k$ and the drive voltages to be output from the driving section 6 are also minimized qualitatively.

Hereinafter, it will be described how the circuit element driver having such a configuration operates. Suppose the lens driving section 20 is driven in such a manner that a current is mainly supplied to the tracking coil 21 and that a relatively small amount of current flows through the focus coil 22 and tilt coil 23. A control of this type can be effective in reading and/or writing information from/on a disk that flutters a little but has a significant eccentricity. This is because a relatively small amount of current may be supplied to the focus coil 22 but a relatively great amount of current needs to be supplied to the tracking coil 21 in such a situation.

Specifically, suppose the voltage instruction values $u_k$ are given by the following Equations (10):

$$u_1 = 0.8 \cdot \sin(2\pi t)$$

$$u_2 = 0.3 \cdot \sin(2\pi(t-0.2))$$

$$u_3 = 0.3 \cdot \sin(2\pi(t+0.2)) \quad (10)$$

In this case, in accordance with the maximum amplitude given by Equations (10), the weighting factors are defined by the following Equations (11):

$$w_1 = 0.8$$

$$w_2 = 0.3$$

$$w_3 = 0.3 \quad (11)$$

When these values are substituted into Equations (8), the matrix B, i.e., the output of the generalized inverse matrix calculator 27, is given by the Equation (12):

$$B = \begin{pmatrix} -0.4210526 & -0.1578947 & -0.1578947 \\ 0.5789474 & -0.1578947 & -0.1578947 \\ -0.4210526 & 0.8421052 & -0.1578947 \\ -0.4210526 & -0.1578947 & 0.8421052 \end{pmatrix} \quad (12)$$

Figure 6A:
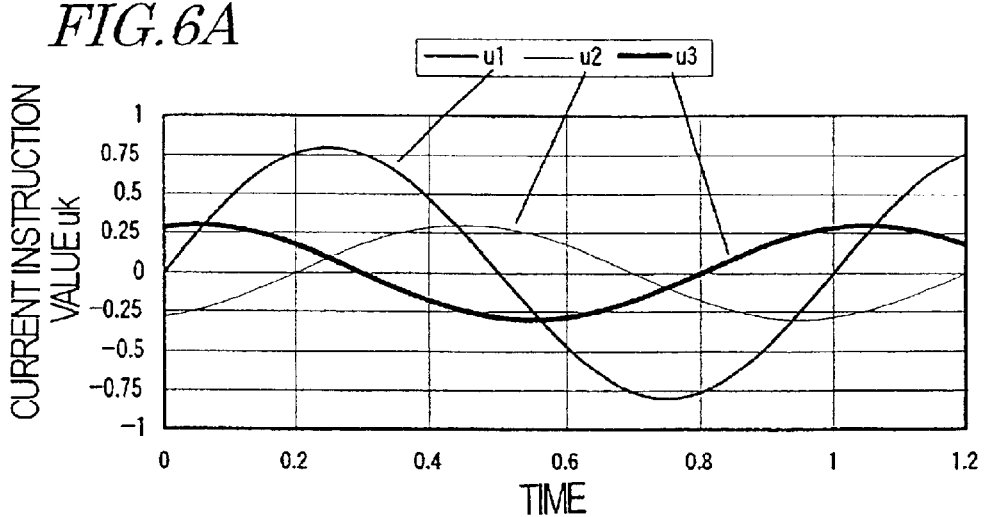
FIGS. 6A, 6B and 6C are graphs showing the waveforms to illustrate how the circuit element driver shown in FIG. 4 operates.
Figure 6B:
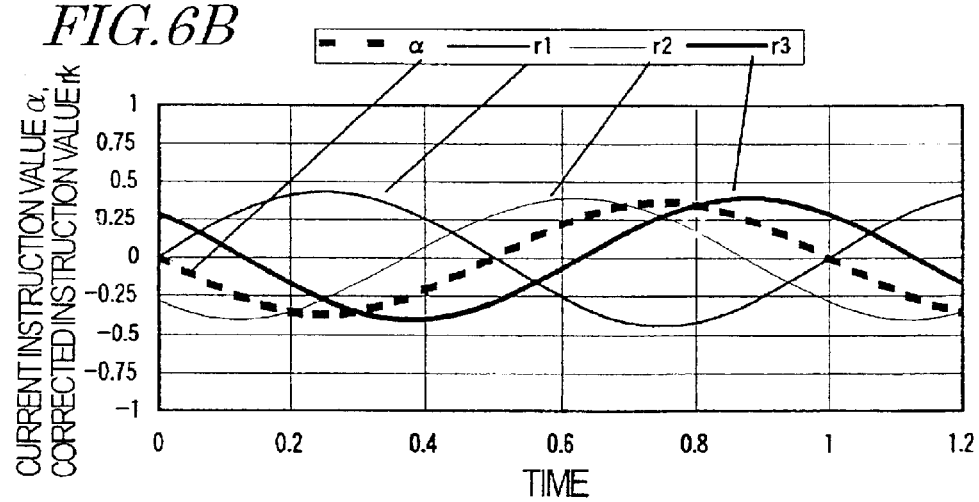
Figure 6C:
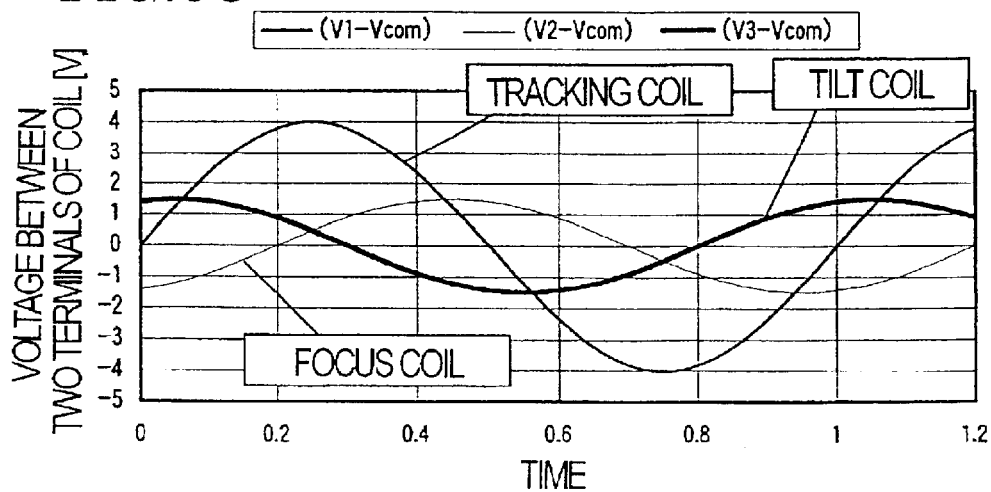

Next, it will be described how the circuit element driver operates in response to the voltage instruction values $u_k$ given by the Equations (10). FIG. 6A shows the waveforms of the voltage instruction values $u_1$, $u_2$ and $u_3$ that have been input to the circuit element driver of this preferred embodiment. FIG. 6B shows the waveforms of the common instruction value $\alpha$ and corrected instruction values $r_k$ that have been calculated by, and output from, the linear matrix calculating section 25 in response to the voltage instruction values $u_k$. In accordance with the common instruction value $\alpha$ and corrected instruction values $r_k$, the driving section 6 outputs the voltages $V_{com}$ and $V_k$. FIG. 6C shows the waveforms of the potential differences $V_k$–$V_{com}$ to be created at the coils 21, 22 and 23. In FIGS. 6A, 6B and 6C, the abscissa represents the time and the ordinate represents the voltage.

As shown in FIG. 6A, the voltage instruction value $u_1$ has a sine wave with an amplitude of 0.8 and the absolute value of the maximum value thereof exceeds 0.5. However, as shown in FIG. 6B, the absolute values of the corrected instruction values $r_k$ and common instruction value $\alpha$ never exceed 0.5 but fall within a range of ±0.5. That is to say, the outputs of the driving section 6 are never saturated. This is because the matrix B is determined in such a manner as to minimize the variable J of the performance index given by Equation (9) and to prevent the outputs from being saturated so easily.

To prevent the absolute values of the maximum corrected instruction values $r_k$ from exceeding 0.5 and yet not to decrease the maximum voltages that can be applied to the coils 21, 22 and 23, the voltage $V_{com}$ to be applied to the common terminal 24, which is connected in common to the coils 21, 22 and 23, is changed. As shown in FIG. 6B, the common instruction value $\alpha$ provided for generating the voltage $V_{com}$ shows a waveform that has its polarities substantially inverted from those of the waveform of the corrected instruction value $r_1$. Accordingly, the potential difference that is actually created between the two terminals of the coil 21 becomes ±4 V as shown in FIG. 6C.

As for the voltage instruction values $u_2$ and $u_3$, the corrected instruction values $r_2$ and $r_3$ are out of phase with the voltage instruction values $u_2$ and $u_3$ and the absolute values of the maximum corrected instruction values $r_2$ and $r_3$ are greater than those of the maximum voltage instruction values $u_2$ and $u_3$ as can be seen from FIGS. 6A and 6B. However, as shown in FIG. 6C, the potential difference $V_2$–$V_{com}$ created between the two terminals of the coil 22 and the potential difference $V_3$–$V_{com}$ created between the two terminals of the coil 23 are in phase with, and substantially proportional to, the voltage instruction values $u_2$ and $u_3$.

In the conventional driving method in which the common terminal is fixed at the intermediate value of the supply voltage, the maximum amplitude cannot exceed 2.5 V. In contrast, according to this preferred embodiment, a voltage of 4 V can be applied.

In the preferred embodiment described above, the weights of the voltage instruction values are calculated by reference to the history of the voltage instruction values, thereby changing the values of the matrix B. By using a matrix like this, the potential difference created between the two terminals of the coil 21, 22 or 23 can be well matched with its associated input voltage instruction value. Also, in the preferred embodiment described above, a ∞ norm is used as the weight $w_k$. However, similar effects are also achievable by any other norm such as a Euclidean norm, i.e., the mean square of the signals. Furthermore, in the preferred embodiment described above, the weights of the voltage instruction values are measured by reference to the history of the voltage instruction values. Alternatively, any other weighting factor may be arbitrarily selected by the designer.

The matrix B may also be made up of constants. For example, where the weight matrix R is a unit matrix, the matrix B has a form with good symmetry as given by the following Equation (13):

$$B = \begin{pmatrix} 0 & 0 & 0 \\ 1 & 0 & 0 \\ 0 & 1 & 0 \\ 0 & 0 & 1 \end{pmatrix} + \left(-\frac{1}{4}\right)\begin{pmatrix} 1 & 1 & 1 \\ 1 & 1 & 1 \\ 1 & 1 & 1 \\ 1 & 1 & 1 \end{pmatrix} \quad (13)$$

Figure 7:
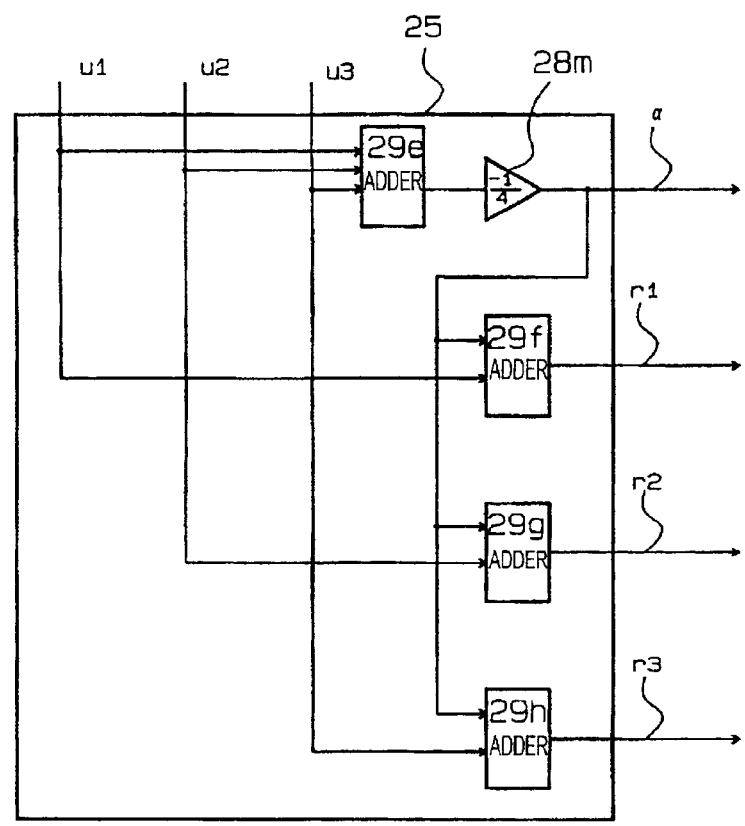
FIG. 7 is a block diagram illustrating an alternative linear matrix calculating section for the circuit element driver shown in FIG. 4.

If the matrix B has good symmetry, the linear matrix calculating section 25 as the control section can have its configuration simplified by utilizing the linearity of the calculation. FIG. 7 is a block diagram illustrating a modified example of the second preferred embodiment. As shown in FIG. 7, the linear matrix calculating section 25 includes adders 29e, 29f, 29g and 29h and a multiplier 28m. The adder 29e adds up the voltage instruction values $u_1$, $u_2$ and $u_3$ and outputs the sum to the multiplier 28m. In response, the multiplier 28m multiplies the sum by –¼ and then outputs the product as the common instruction value $\alpha$.

On the other hand, the adders 29f, 29g and 29h add the common instruction value $\alpha$ to the voltage instruction values $u_1$, $u_2$ and $u_3$, respectively, and output the sums as the corrected instruction values $r_1$, $r_2$ and $r_3$, respectively. This linear matrix calculating section 25 needs a reduced number of multipliers by utilizing the linearity. As a result, the computational speed can be increased and the power dissipation can be cut down.

In the circuit element driver of the second preferred embodiment described above, the driving section 6, linear matrix calculating section 25, weight calculator 26 and generalized inverse matrix calculator 27 may be implemented as known analog circuits, each made up of conventional electronic components. Alternatively, the functions performed by these circuits and components may also be implementable by means of software-based signal processing using a microcomputer or digital signal processor (DSP).

Embodiment 3

A circuit element driver according to a third specific preferred embodiment of the present invention is also used to drive a lens driver for an optical disk drive as in the second preferred embodiment described above. The circuit element driver of this preferred embodiment performs a pulse width modulation (PWM) control.

Figure 8:
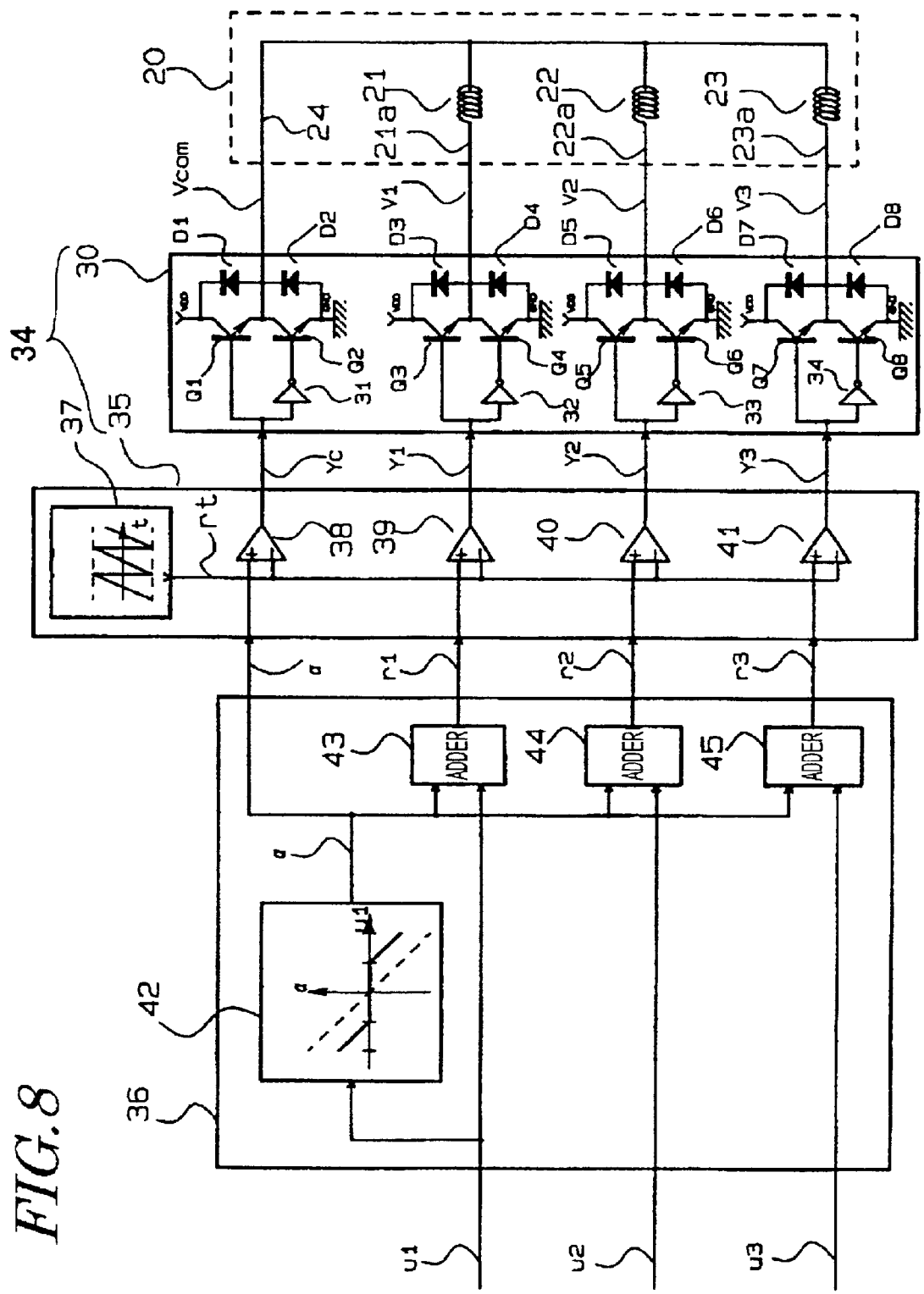
FIG. 8 is a block diagram illustrating a circuit element driver according to a third specific preferred embodiment of the present invention.

FIG. 8 is a block diagram illustrating a circuit element driver according to the third preferred embodiment. As in the second preferred embodiment described above, the lens driver 20 includes the tracking coil 21, focus coil 22 and tilt coil 23. As already described in detail for the second preferred embodiment, these three coils 21, 22 and 23 are connected in common to a single conductive elastic member at one terminal thereof and also connected to their respective conductive elastic members at the other terminal thereof. The former conductive elastic member, connected in common to the three coils 21, 22 and 23, and the latter three conductive elastic members, connected to the tracking, focus and tilt coils 21, 22 and 23, respectively, are connected to the common terminal 24 and individual terminals 21a, 22a and 23a, respectively.

The circuit element driver of this preferred embodiment includes a control section 36 and a driving section 34.

As in the first and second preferred embodiments described above, the control section 36 also receives the current instruction values $u_1$, $u_2$ and $u_3$, which are instructions issued for the tracking, focus and tilt coils 21, 22 and 23, respectively, and then outputs the common instruction value $\alpha$ and corrected instruction values $r_1$, $r_2$ and $r_3$. A specific circuit configuration for the control section 36 will be described in detail later.

The driving section 34, which receives the common instruction value $\alpha$ and corrected instruction values $r_1$, $r_2$ and $r_3$, includes a duty changer 35 and a switching driver 30. The duty changer 35 receives the common instruction value $\alpha$ and corrected instruction values $r_1$, $r_2$ and $r_3$, thereby generating switching signals $Y_c$, $Y_1$, $Y_2$ and $Y_3$.

The duty changer 35 includes: a reference signal generator 37 that outputs a triangular or sawtooth wave; and comparators 38, 39, 40 and 41. The comparators 38, 39, 40 and 41 compare a reference signal $r_f$, generated by the reference signal generator 37, with the common instruction value $\alpha$ and corrected instruction values $r_1$, $r_2$ and $r_3$ and output the results as the switching signals $Y_c$, $Y_1$, $Y_2$ and $Y_3$, respectively. That is to say, the duty changer 35 generates the switching signals $Y_c$, $Y_1$, $Y_2$ and $Y_3$ having duty cycles corresponding to the common instruction value $\alpha$ and corrected instruction values $r_1$, $r_2$ and $r_3$, respectively.

The switching driver 30 receives the switching signals $Y_c$, $Y_1$, $Y_2$ and $Y_3$ and independently outputs voltage waveforms $V_{com}$, $V_1$, $V_2$ and $V_3$ corresponding to the switching signals $Y_c$, $Y_1$, $Y_2$ and $Y_3$, respectively. For this purpose, the switching driver 30 includes four independent circuits.

Each of these four circuits of the switching driver 30 includes two bipolar transistors, two diodes and one signal inverter. In the circuit that receives the switching signal $Y_c$ and outputs the voltage $V_{com}$ to the common terminal 24, for example, the switching signal $Y_c$ is input to the transistor $Q_1$ and inverter 31, and the output of the inverter 31 is further input to the transistor $Q_2$. The collector of the transistor $Q_1$ is connected to the maximum supply voltage VDD. The emitter of the transistor $Q_2$ is connected to the minimum supply voltage GND. The emitter of the transistor $Q_1$ and the collector of the transistor $Q_2$ are connected together to output the voltage $V_{com}$. The diodes $D_1$ and $D_2$ are connected between the collector and emitter of the transistor $Q_1$ and between the collector and emitter of the transistor $Q_2$, respectively, and are used to protect the transistors $Q_1$ and $Q_2$ from an overvoltage.

In the other three circuits that receive the switching signals $Y_1$, $Y_2$ and $Y_3$ and output the voltages $V_1$, $V_2$ and $V_3$, respectively, signal inverters 32, 33 and 34, transistors $Q_3$ and $Q_4$, $Q_5$ and $Q_6$ and $Q_7$ and $Q_8$ and diodes $D_3$ and $D_4$, $D_5$ and $D_6$ and $D_7$ and $D_8$ are connected just like the circuit described above.

Next, the configuration of the control section 36 will be described. As shown in FIG. 8, the control section 36 includes a common instruction value calculator 42 and adders 43, 44 and 45. The current instruction value $u_1$, received by the control section 36, is input to the common instruction value calculator 42. In response to the current instruction value $u_1$, the common instruction value calculator 42 calculates and outputs the common instruction value $\alpha$. The common instruction value $\alpha$ is output as it is to the comparator 38 of the duty changer 35. On the other hand, the adder 43 adds up the current instruction value $u_1$ and the common instruction value $\alpha$ and outputs the sum as the corrected instruction value $r_1$. In the same way, the adder 44 adds up the current instruction value $u_2$ and the common instruction value $\alpha$ and outputs the sum as the corrected instruction value $r_2$. The adder 45 adds up the current instruction value $u_3$ and the common instruction value $\alpha$ and outputs the sum as the corrected instruction value $r_3$.

In this preferred embodiment, only the current instruction value $u_1$ is input to the common instruction value calculator 42. This is done to cope with a situation where the drive of the tracking coil 21 should come earlier than the focus coil 22 or the tilt coil 23. That type of drive is needed when the disk has great eccentricity and greater driving force is necessary for the tracking control. This respect will be described in further detail later.

Figure 9:
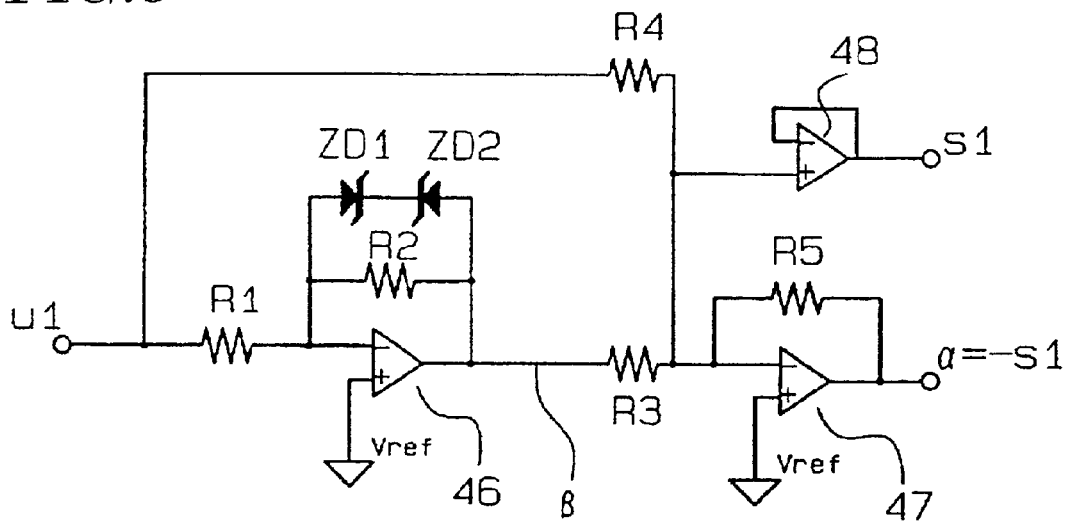
FIG. 9 is a circuit diagram illustrating a specific configuration for the common instruction value calculator of the circuit element driver shown in FIG. 8.

In this preferred embodiment, a circuit such as that shown in FIG. 9 may be used as the common instruction value calculator 42. As shown in FIG. 9, the common instruction value calculator 42 includes operational amplifiers 46, 47 and 48.

The operational amplifier 46 and resistors $R_1$ and $R_2$ together makes up an inverting amplifier. A serial connection of Zener diodes $ZD_1$ and $ZD_2$ is connected in parallel to the resistor $R_2$. In accordance with the magnitude of the input current instruction value $u_1$, the operational amplifier 46 outputs an intermediate calculated value $\beta$. The operational amplifier 47 is an inverted sum calculator. Specifically, the operational amplifier 47 adds up the current instruction value $u_1$, which has been input thereto through a resistor $R_4$, and the signal $\beta$, which has been input thereto through a resistor $R_3$, and outputs the sum as the common instruction value $\alpha$ with a gain that is defined as a ratio of the combined resistance value of the resistors $R_3$ and $R_4$ to the resistance value of a resistor $R_5$.

In this configuration, the resistors $R_1$, $R_2$, $R_3$, $R_4$ and $R_5$ all have substantially the same resistance value. The operational amplifier 48 is provided as a buffer and outputs an output shortage $s_1$, which is the sum of the current instruction value $u_1$ and the intermediate calculated value $\beta$. The output shortage $s_1$ is a value indicating how much the output of the tracking coil 21 is short of its required level when the common instruction value $\alpha$ is zero. The output shortage $s_1$ will be described in detail later. It should be noted that the common instruction value $\alpha$ is the inverse of the output shortage $s_1$.

Figure 10:
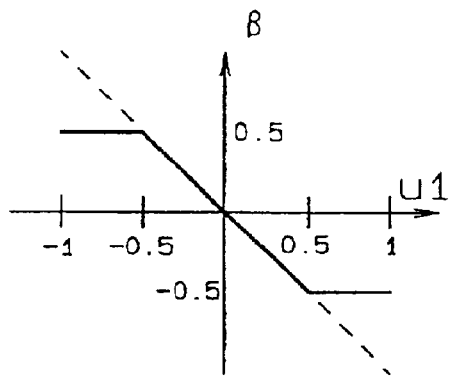
FIG. 10 is a graph showing a relationship between the voltage instruction value $u_1$ and the intermediate calculated value β in the common instruction value calculator shown in FIG. 9.

Hereinafter, it will be described how the circuit element driver having such a configuration operates. FIG. 10 shows a relationship between the current instruction value $u_1$ and the intermediate calculated value $\beta$ in the common instruction value calculator 42 of the control section 36. In FIG. 10, the abscissa and ordinate respectively represent the current instruction value $u_1$ and intermediate calculated value $\beta$ that have been normalized.

The operational amplifier 46 inverts and amplifies the input current instruction value $u_1$ at the ratio of the resistance of the resistor $R_1$ to that of the resistor $R_2$. However, its output voltage being fed back is limited by the Zener diodes $ZD_1$ and $ZD_2$ that are connected in parallel to the resistor $R_2$. Thus, the output of the operational amplifier 46 is limited to an appropriate voltage. In this preferred embodiment, the Zener diodes $ZD_1$ and $ZD_2$ are selected appropriately so as to limit the absolute value of the output voltage to 0.5.

If the absolute value of the current instruction value $u_1$ is equal to or smaller than 0.5, then the operational amplifier 46 inverts the current instruction value $u_1$ and outputs the inverted value as the intermediate calculated value $\beta$. On the other hand, if the absolute value of the current instruction value $u_1$ is greater than 0.5, then the operational amplifier 46 inverts the current instruction value $u_1$ and outputs a signal having an absolute value of 0.5 as the intermediate calculated value $\beta$.

It is to obtain information about output saturation by providing a voltage saturation model of the driving section 34 (including the duty changer 35 and switching driver 30) within the control section 36 that the intermediate calculated value $\beta$ is intentionally saturated at the absolute value of 0.5. Suppose the current instruction value $u_1$ is output as it is to the driving section 34. In that case, if the current instruction value $u_1$ has an absolute value of 0.5 or less, then the output of the driving section 34 will not be saturated. However, if the absolute value of the current instruction value $u_1$ exceeds 0.5, then the output of the driving section 34 will be saturated and short of its required level. Thus, in this preferred embodiment, the output shortage $s_1$ is obtained as the sum of the intermediate calculated value $\beta$ and the current instruction value $u_1$.

Figure 11:
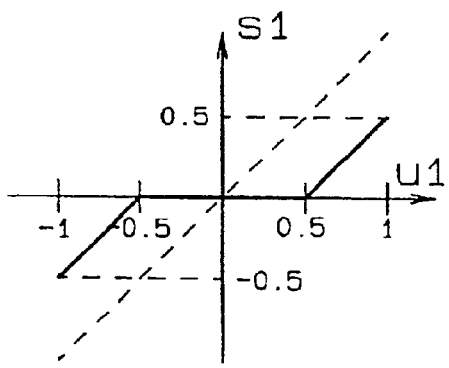
FIG. 11 is a graph showing a relationship between the voltage instruction value $u_1$ and the output shortage $s_1$ in the common instruction value calculator shown in FIG. 9.

FIG. 11 shows a relationship between the current instruction value $u_1$ and the output shortage $s_1$. In FIG. 11, the abscissa represents the current instruction value $u_1$ and the ordinate represents the output shortage $s_1$. Both of these values are normalized voltages. As can be clearly seen from FIG. 11, while the current instruction value $u_1$ falls within a range of −0.5 to 0.5, the output shortage $s_1$ is zero. In the other ranges, however, the output shortage $s_1$ increases in proportion to the current instruction value $u_1$.

Figure 12:
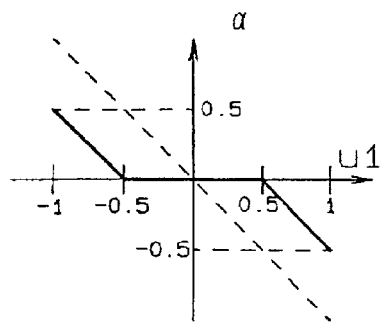
FIG. 12 is a graph showing a relationship between the voltage instruction value $u_1$ and the common instruction value α in the common instruction value calculator shown in FIG. 9.

By generating the common instruction value $\alpha$ from the output shortage $s_1$ obtained in this manner and controlling the voltage to be applied to the common terminal 24, the shortage of the drive voltage for the tracking coil 21 can be overcome. That is to say, since the voltage $V_{com}$ at the common terminal 24 has only to be regulated by the output shortage $s_1$, the common instruction value $\alpha$ is obtained as the inverse of the output shortage $s_1$. Specifically, the output of the operational amplifier 47 is used as the common instruction value $\alpha$. FIG. 12 shows a relationship between the current instruction value $u_1$ and the common instruction value $\alpha$ in the circuit element driver shown in FIG. 8. In FIG. 12, the abscissa represents the current instruction value $u_1$ and the ordinate represents the common instruction value $\alpha$. Both of these values are normalized voltages.

In this preferred embodiment, the output shortage $s_1$ of the tracking coil 21 is corrected by using the voltage $V_{com}$ applied to the common terminal 24. Accordingly, the voltage $V_{com}$ applied to the common terminal 24 also affects the driving states of the other two coils, i.e., the focus and tilt coils 22 and 23. To reduce this effect, the common instruction value $\alpha$ output from the common instruction value calculator 42 is input to the adders 44 and 45, too. In response to the current instruction value $u_2$, the adder 44 outputs the sum of the current instruction value $u_2$ and the common instruction value $\alpha$ as the corrected instruction value $r_2$. On the other hand, in response to the current instruction value $u_3$, the adder 45 outputs the sum of the current instruction value $u_3$ and the common instruction value $\alpha$ as the corrected instruction value $r_3$. Since the common instruction value $\alpha$ is the inverse of the output shortage $s_1$, a voltage equivalent to the output shortage $s_1$ can be subtracted from the current instruction values $u_2$ and $u_3$ as a result of this addition. In this manner, the unwanted effect of the voltage $V_{com}$ applied to the common terminal 24 on the focus and tilt coils 22 and 23 be canceled.

The common instruction value $\alpha$ is also input to the adder 43, which adds up the common instruction value $\alpha$ and the current instruction value $u_1$. If the current instruction value $u_1$ is greater than 0.5, then the common instruction value $\alpha$ is the inverse of the output shortage $s_1$. Accordingly, even if the current instruction value $u_1$ is greater than 0.5, the corrected instruction value $r_1$ output remains 0.5 as a result of this addition.

Figure 13:
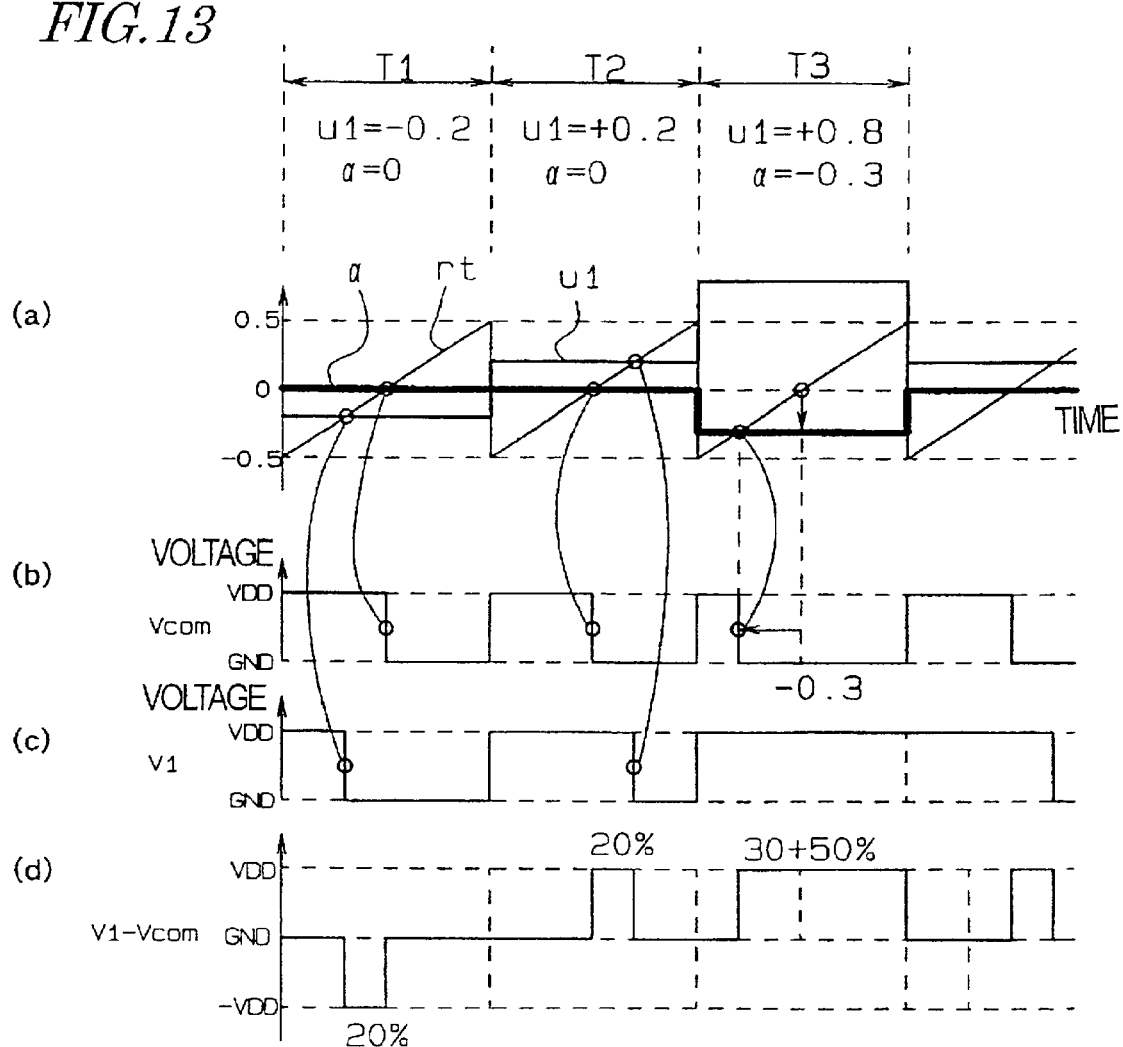
FIG. 13 shows the waveforms to illustrate how to generate the voltage to be applied to the tracking coil 21 shown in FIG. 8.

Next, the potential difference created between the two terminals of the tracking coil 21 will be described. Portion (a) of FIG. 13 shows how the current instruction value $u_1$, reference signal $r_t$ and common instruction value $\alpha$ change with time. In portion (a) of FIG. 13, the abscissa represents the time and the ordinate represents the normalized voltage. The reference signal $r_t$ is generated by the reference signal generator 37 of the duty changer 35 and has a sawtooth wave that changes from −0.5 V to +0.5 V at a constant rate in one period. This sawtooth wave has an amplitude of 0.5. Accordingly, if the absolute value of the corrected instruction value $r_k$ exceeds 0.5, the surplus is neglected as a result of comparison between the corrected instruction value $r_k$ and the reference signal $r_t$. That is to say, even if the corrected instruction value $r_k$ specified is greater than 0.5, the corrected instruction value $r_k$ is also regarded as 0.5, thus affecting neither the switching instructions nor the driving states of the coil.

In portion (a) of FIG. 13, the time plotted on the axis of abscissas is divided into time intervals $T_1$, $T_2$ and $T_3$ on the basis of one period of the reference signal $r_t$. With the passage of time through the time intervals $T_1$, $T_2$ and $T_3$, the current instruction value $u_1$ changes in the order of −0.2, +0.2 and +0.8. In the time intervals $T_1$ and $T_2$, the current instruction values $u_1$ are within ±0.5, and therefore, the common instruction value $\alpha$ is zero. On the other hand, in the time interval $T_3$, the current instruction value $u_1$ is +0.8, which is greater than the constant of +0.5 by 0.3. Accordingly, as can be seen from the input-output relationship shown in FIG. 12, $\alpha$ is −0.3.

In the duty changer 35, the comparators 38 and 39 compare the reference signal $r_t$ with the common instruction value $\alpha$ and the corrected instruction value $r_1$, respectively. Based on the results of these comparisons, the comparators 38 and 39 output the switching signals $Y_c$ and $Y_1$, respectively.

Portion (b) of FIG. 13 shows the waveform of the voltage $V_{com}$ that the switching driver 30 outputs in response to the switching signal $Y_c$, while portion (c) of FIG. 13 shows the waveform of the voltage $V_1$ that the switching driver 30 outputs in response to the switching signal $Y_1$. In portions (b) and (c) of FIG. 13, the abscissa represents the time and the ordinate represents the voltage.

First, the voltage $V_{com}$ will be described with reference to portions (a) and (b) of FIG. 13. In the first half of the time interval $T_1$, $r_t < \alpha$, and the switching signal $Y_c$ is logical one. While the switching signal $Y_c$ is in logical one state, the transistor $Q_1$ turns ON and the transistor $Q_2$ turns OFF. In that case, the voltage $V_{com}$ applied to the common terminal 24 equals the maximum level VDD of the supply voltage. On the other hand, in the second half of the time interval $T_1$, $r_t > \alpha$, and the switching signal $Y_c$ is logical zero. While the switching signal $Y_c$ is in logical zero state, the transistor $Q_1$ turns OFF and the transistor $Q_2$ turns ON. In that case, the voltage $V_{com}$ applied to the common terminal 24 equals the minimum level GND of the supply voltage. The same operations are repeated in the next time interval $T_2$. Accordingly, the voltage $V_{com}$ is switched from VDD into GND at the intermediate point of the interval $T_1$ and at the intermediate point of the interval $T_2$. That is to say, the voltage $V_{com}$ is switched when the level relationship between the common instruction value α and the reference signal $r_t$ is reversed. In the time interval $T_3$, the voltage $V_{com}$ is also switched from VDD into GND. However, since α is −0.3 in this time interval $T_3$, the switching point is earlier than the time interval $T_1$ or $T_2$.

Next, the voltage $V_1$ will be described with reference to portions (a) and (c) of FIG. 13. In the time interval $T_1$, the current instruction value $u_1$ is −0.2. Accordingly, the voltage $V_1$ is switched from VDD into GND in the first half of this interval $T_1$ just like the voltage $V_{com}$. In the next time interval $T_2$, the current instruction value $u_1$ is +0.2. Accordingly, the voltage $V_1$ is switched from VDD into GND in the second half of this interval $T_2$. In the third time interval $T_3$, the current instruction value $u_1$ is +0.8. Accordingly, the corrected instruction value $r_1$, which is the sum of the current instruction value $u_1$ and the common instruction value α, is 0.5 (=+0.8+(−0.3)). In that case, the voltage $V_1$ is not switched. As a result, the voltage $V_1$ remains VDD in the interval $T_3$.

Portion (d) of FIG. 13 shows the difference between the voltages $V_1$ and $V_{com}$, i.e., the waveform of the potential difference $(V_1-V_{com})$ created between the two terminals of the tracking coil 21. In the time interval $T_1$, a potential difference of −VDD is created between the two terminals of the tracking coil 21. In the next time interval $T_2$, a potential difference of +VDD is created between the two terminals of the tracking coil 21. In each of these time intervals $T_1$ and $T_2$, the voltage is applied for 20% of the time width thereof. In the third time interval $T_3$, the voltage application time is extended for the amount of time corresponding to the correction of −0.3 to the common instruction value α. As a result, the voltage of +VDD is applied for 80% of its time width. It is clear that similar operations will be observed even if the current instruction value $u_1$ is none of these values. Accordingly, the length of time for which the voltage is applied between the two terminals of the tracking coil 21 is proportional to the current instruction value $u_1$. Thus, if one period of the reference signal $r_t$ is sufficiently short, then a current in an amount proportional to the current instruction value $u_1$ flows through the tracking coil 21.

Figure 14:
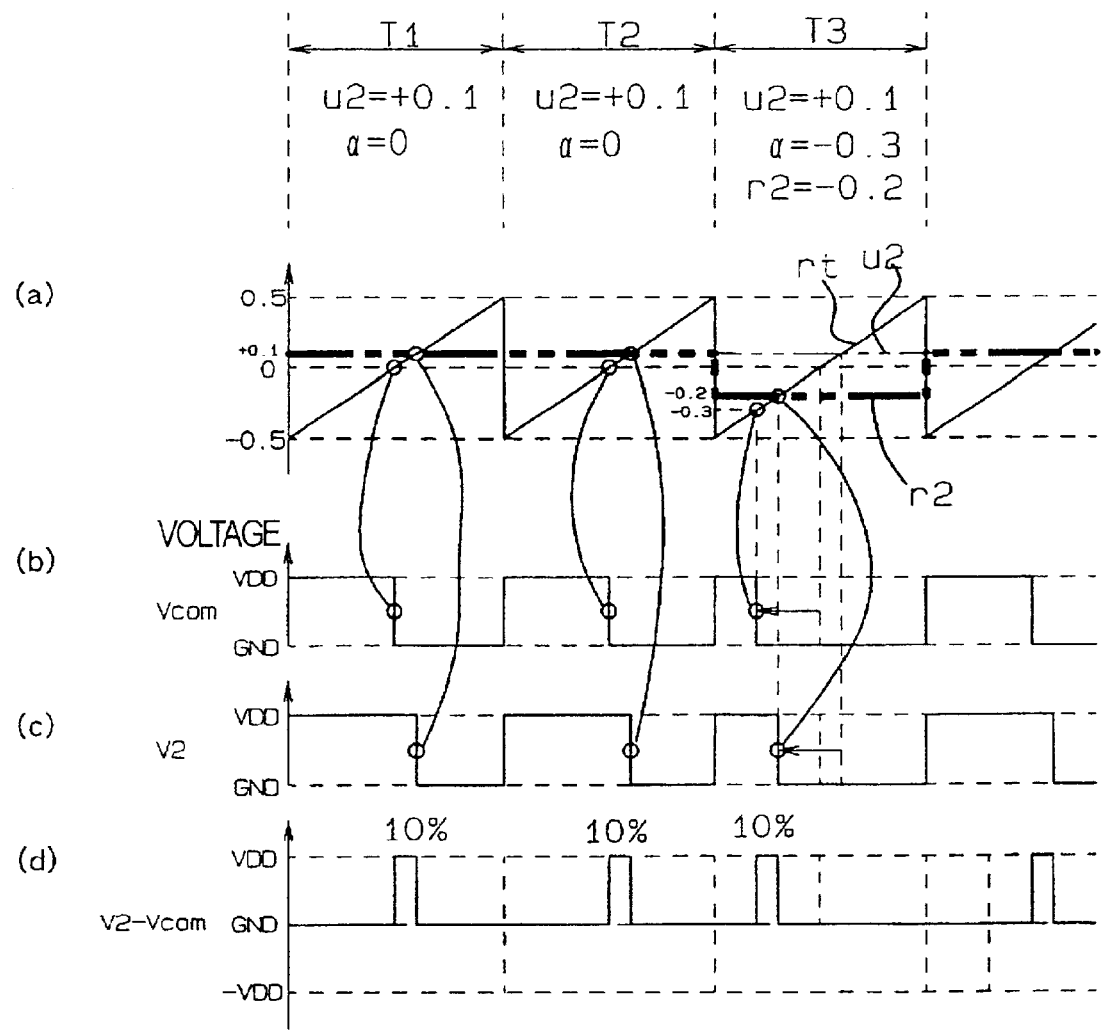
FIG. 14 shows the waveforms to illustrate how to generate the voltage to be applied to the focus coil 22 shown in FIG. 8.

Next, it will be described how the focus coil 22 is driven. Portion (a) of FIG. 14 shows how the current instruction value $u_2$, reference signal $r_t$ and corrected instruction value $r_2$ change with time. In portion (a) of FIG. 14, the abscissa represents the time and the ordinate represents the normalized voltage. The reference signal $r_t$ and the common instruction value α shown in portion (a) of FIG. 14 are the same as the counterparts shown in portion (a) of FIG. 13. In the time intervals $T_1$ through $T_3$, the current instruction value $u_2$ is supposed to be kept constant at +0.1. In the time intervals $T_1$ and $T_2$, the common instruction value α is zero. Accordingly, in these intervals, the corrected instruction value $r_2$ is equal to the current instruction value $u_2$. In the third time interval $T_3$ on the other hand, α=−0.3, and the corrected instruction value $r_2$ is −0.2 (=+0.1+(−0.3)). Then, in the duty changer 35, the comparator 40 compares the reference signal $r_t$ with the corrected instruction value $r_2$, thereby outputting the switching signal $Y_2$ based on the result of the comparison.

Portions (b) and (c) of FIG. 14 show the waveforms of the voltages $V_{com}$ and $V_2$, respectively. Portion (d) of FIG. 14 shows the waveform of the potential difference $(V_2-V_{com})$ created between the two terminals of the focus coil 22. In portions (b), (c) and (d) of FIG. 14, the abscissa represents the time and the ordinate represents the voltage.

As already described with reference to portions (a), (b) and (c) of FIG. 13, the voltages $V_2$ and $V_{com}$ are generated in accordance with the current instruction value $u_2$ and the common instruction value α in the time intervals $T_1$ and $T_2$. Accordingly, in these intervals $T_1$ and $T_2$, a voltage of +VDD is applied between the two terminals of the focus coil 22 for 10% of the time width thereof. In the third time interval $T_3$, although the current instruction value $u_2$ remains +0.1 as in the previous time intervals $T_1$ and $T_2$, the common instruction value α is −0.3. Thus, the corrected instruction value $r_2$ is −0.2. That is to say, to compensate for the variation in voltage $V_{com}$ that changes with the common instruction value α, the corrected instruction value $r_2$ is regulated. As a result, the potential difference $(V_2-V_{com})$ created between the two terminals of the focus coil 22 remains the same as in the preceding intervals $T_1$ and $T_2$.

In the time interval $T_3$, however, the common instruction value α is −0.3, and the current that can be output in accordance with the current instruction value $u_2$ is limited. Specifically, the maximum amount of time in which the voltage of +VDD can be applied to the focus coil 22 is 20% of the time width of the interval $T_3$. In other words, the maximum amount of time in which the voltage of −VDD can be applied to the focus coil 22 is 80% of the time width of the interval $T_3$. The tilt coil 23 is also driven in the same way as the focus coil 22.

In the prior art described above, the voltage $V_{com}$ applied to the common terminal is normally fixed at the intermediate value VDD/2 of the supply voltage VDD. This preferred embodiment of the present invention is greatly different from the prior art in that VDD and GND are alternately applied as $V_{com}$ to the common terminal 24. By alternately switching the voltage $V_{com}$ in this manner, the maximum instantaneous voltage that can be applied to a single circuit element can be ±VDD advantageously. Also, in this preferred embodiment, the duty cycle of the voltage $V_{com}$ being switched is not fixed at 50% but the common instruction value α is changed with the output shortage $s_1$ obtained from the current instruction value $u_1$. In this manner, the voltage can be applied to the tracking coil 21 for more than 50% of one time interval.

In the preferred embodiment described above, the current is supplied mainly to the tracking coil 21 and the currents supplied to the focus and tilt coils 22 and 23 are partially limited. Accordingly, this preferred embodiment is particularly effectively applicable to a disk that flutters a little but that has great eccentricity, i.e., to a situation where a relatively small amount of current needs to be supplied to the focus coil 22 but a relatively large amount of current should be supplied to the tracking coil 21.

It should be noted that if information needs to be read or written from/on a disk that flutters much but that has small eccentricity, then an increased amount of current may be supplied to the focus coil 22 and a decreased amount of current may be supplied to the tracking coil 21. To achieve these purposes, the methods of controlling the tracking and focus coils 21 and 22 as described for the third preferred embodiment may be interchanged with each other. Then, information can be read and written constantly.

Figure 15:
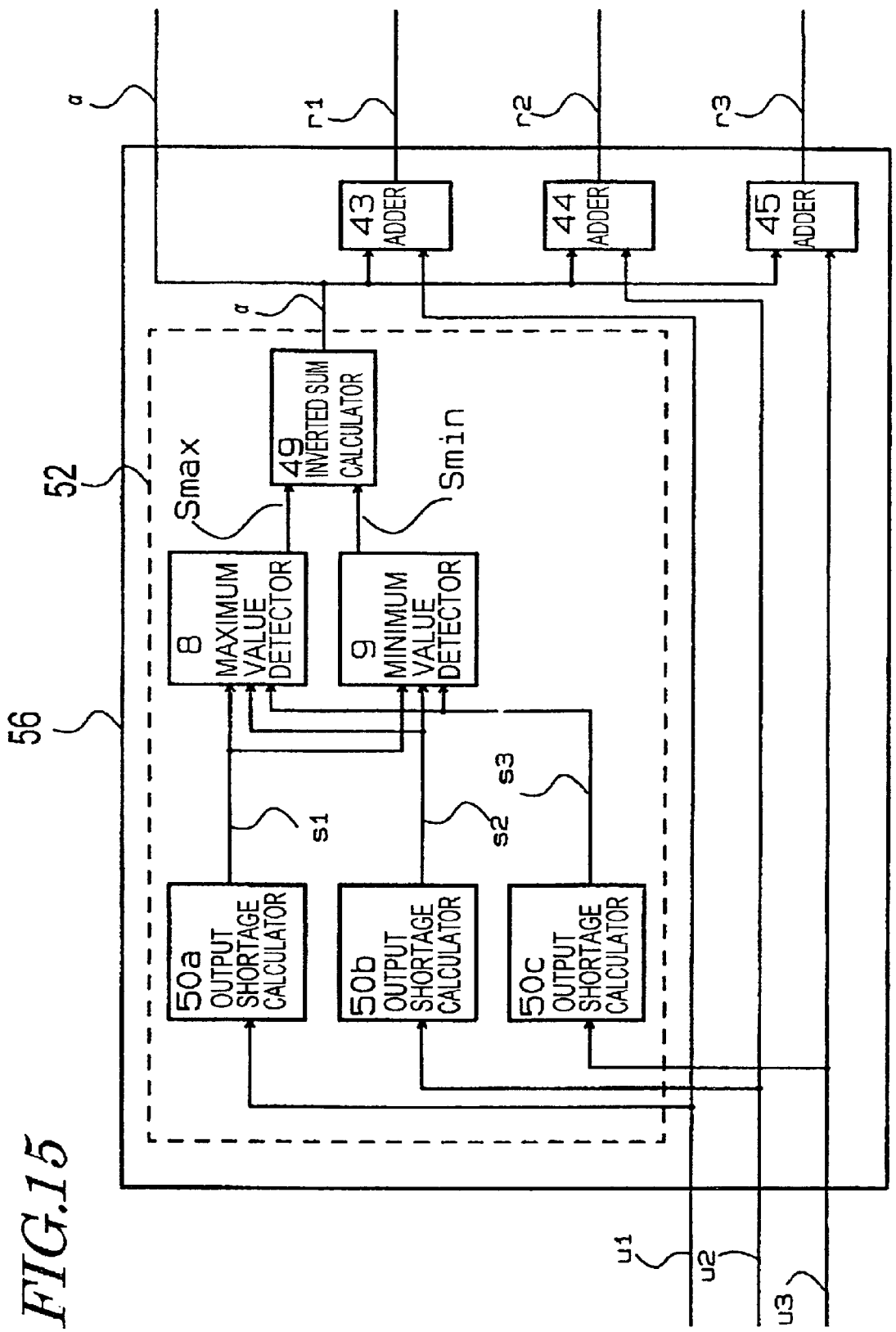
FIG. 15 is a block diagram illustrating an alternative control section for the circuit element driver shown in FIG. 8.

Hereinafter, a modified example of the third preferred embodiment of the present invention will be described. FIG. 15 is a block diagram illustrating a control section 56 as a modified example of the control section 36 of the third preferred embodiment. This alternative control section 56 is different from the counterpart 36 shown in FIG. 8 in the configuration of the common instruction value calculator 52. The adders 43, 44 and 45 are the same as those included in the control section 36 shown in FIG. 8.

As shown in FIG. 15, the common instruction value calculator 52 includes three output shortage calculators 50a, 50b and 50c, which receive the current instruction values $u_k$ and provide output shortages $s_k$ (where k=1, 2 and 3). The output shortages $s_k$ are input to maximum value detector 8 and minimum value detector 9. The maximum value detector 8 outputs the maximum value $S_{max}$ of the output shortages $s_k$, while the minimum value detector 9 outputs the minimum value $S_{min}$ of the output shortages $s_k$. The minimum value $S_{min}$ is a negative output shortage having the greatest absolute value. The maximum and minimum values $S_{max}$ and $S_{min}$ are input to an inverted sum calculator 49, which adds up the maximum and minimum values $S_{max}$ and $S_{min}$, inverts the sign of the sum and then outputs the inverted sum as the common instruction value $\alpha$.

The common instruction value calculator 42 shown in FIG. 15 operates similarly to the counterpart shown in FIG. 8. However, unlike the calculator 42 shown in FIG. 8, the common instruction value calculator 42 shown in FIG. 15 obtains the output shortages $s_k$ not just for the tracking coil 21 but also the other two coils 22 and 23 as well, and gets the maximum and minimum values $S_{max}$ and $S_{min}$ of the output shortages $s_k$ detected by the maximum and minimum value detectors 8 and 9, respectively.

The preferred embodiment of the present invention described above relates to a method for driving three coils. However, the method of the present invention can also be used effectively to drive four or more coils. In general, a number (n+1) of driver circuits need to be prepared to drive a number n of coils. Also, since the circuit provided for each coil has a simple configuration, the present invention can be carried out easily.

In the circuit element driver of the third preferred embodiment described above, the driving section 34 and control section 36 are implemented as known analog circuits for performing arithmetic operations. Alternatively, the functions performed by these circuits may also be implementable by means of software-based signal processing using a microcomputer or digital signal processor (DSP). For example, a signal that has its bits inverted periodically at input/output ports through software-based timer processing may be output to the switching driver 30 for these purposes. In that case, the number of bits needed to drive a number n of coils or circuit elements is (n+1).

Embodiment 4

Hereinafter, a circuit element driver according to a fourth specific preferred embodiment of the present invention will be described.

The circuit element driver of the fourth preferred embodiment has the same configuration as the counterpart shown in FIG. 8. In this preferred embodiment, however, the common instruction value calculator 42 performs a different type of computation. Specifically, in this preferred embodiment, when input instruction values $u_k$ are large enough to produce output shortages, the common instruction value $\alpha$ is determined in such a manner that the output shortage at one particular coil is not so much greater than the output shortages at the other coils. In this preferred embodiment, the computation is carried out by using a DSP. Thus, the following description of this fourth preferred embodiment relates to the procedure of calculating the common instruction value $\alpha$.

First, suppose k is herein an integer representing a coil number, the voltage instruction values $u_k$ are herein given values and the common instruction value $\alpha$ is herein an unknown parameter to be obtained through computation.

The output shortage $s_k$ is defined by the following Equation (14) including the common instruction value $\alpha$:

$$s_k = (u_k + \alpha) \cdot sgn(u_k) - q \quad (14)$$

where sgn(x) is a signum function defined by the following Equation (15):

$$sgn(x) = \begin{cases} -1, & (x < 0) \\ 0, & (x = 0) \\ 1, & (x > 0) \end{cases} \quad (15)$$

and q is a constant of 0.5. If the output shortage $s_k$ is a negative value, the $k^{th}$ coil is driven in accordance with the voltage instruction value $u_k$. On the other hand, if the output shortage $s_k$ is a positive value, the $k^{th}$ coil is short of its drive current required.

Next, a performance index using the output shortage $s_k$ as an argument is defined by the following Equation (16):

$$J(\alpha) = \max_k (w_k \cdot s_k) \quad (16)$$

where $w_k$ is a weighting factor. This performance index $J(\alpha)$ is used to output the maximum product of $s_k$ and the weighting factor $w_k$. The weighting factor $w_k$ may be either a constant obtained by getting the influence on the system estimated by the designer or a value obtained from the norm of the voltage instruction value $u_k$ with respect to time. For example, supposing the weighting factor $w_k$ is the inverse of the maximum amplitude of the voltage instruction value $u_k$, ($w_k \cdot s_k$) represents the percentage of shortage at the $k^{th}$ coil to the maximum amplitude of the voltage instruction value $u_k$. If the performance index given by Equation (16) is minimized, then the percentage of shortage to the maximum amplitude of the voltage instruction value $u_k$ cannot be outstandingly high at any particular coil. That is to say, the shortage of drive voltage cannot be concentrated at any particular coil.

Next, it will be described how to obtain the common instruction value $\alpha$ that minimizes the performance index defined by Equation (16). First, suppose the integers i and j represent two coil numbers. Candidate common instruction values $\alpha_{ij}$ are obtained for a voltage instruction value $u_i$ and another voltage instruction value $u_j$, having a sign opposite to that of the voltage instruction value $u_i$, by the following Equation (17):

$$\alpha_{ij} = \frac{q(w_i - w_j) - (w_i |u_i| - w_j |u_j|)}{(w_i sgn(u_i) - w_j sgn(u_j))}, (i \neq j \wedge sgn(u_i) sgn(u_j) = -1) \quad (17)$$

Next, $\alpha$ that minimizes the performance index defined by Equation (16) is selected from the candidate common instruction values $\alpha_{ij}$. In this manner, the desired common instruction value $\alpha$ can be obtained. A situation where the two voltage instruction values $u_i$ and $u_j$ have the same sign (i.e., sgn ($u_i$)·sgn ($u_j$)=1) is neglected from this computation process. This is done to omit the step of obtaining a meaningless solution and thereby increase the computational speed.

It should be noted that Equation (17) is deeply correlated with the first preferred embodiment and is obtained by extending Equation (1). For example, if all weighting factors $w_k$ are equal, Equation (17) is obtained. That is to say, the computation of this fourth preferred embodiment is achieved by performing the computation of the first preferred embodiment with the weights of signals taken into account.

Hereinafter, it will be described how the common instruction value calculator 42 of this preferred embodiment performs the computation. The following Table 1 shows exemplary amplitudes, weighting factors $w_k$ and specific signal values of the voltage instruction values $u_k$:

TABLE 1

| Amplitude of $u_1$ | Amplitude of $u_2$ | Amplitude of $u_3$ | Amplitude of $u_4$ |
|---|---|---|---|
| 0.9 | 0.8 | 0.7 | 0.3 |
| $w_1$ | $w_2$ | $w_3$ | $w_4$ |
| 1.11 | 1.25 | 1.43 | 3.33 |
| Signal value of $u_1$ | Signal value of $u_2$ | Signal value of $u_3$ | Signal value of $u_4$ |
| 0.8 | −0.7 | −0.5 | −0.3 |

Figure 16:
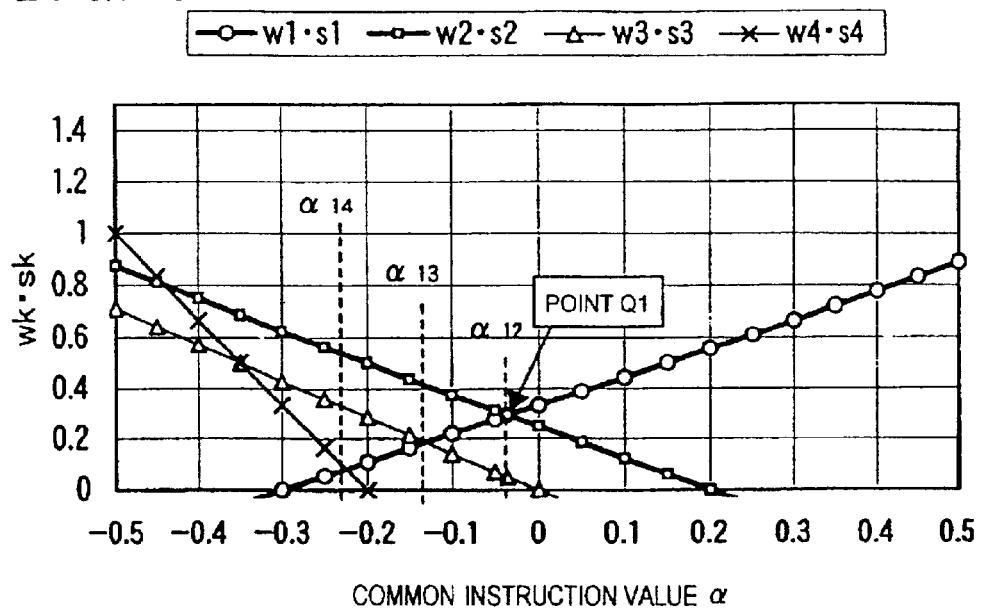
FIG. 16 is a graph showing relationships between ($w_k \cdot s_k$) and the common instruction value α in a circuit element driver according to a fourth specific preferred embodiment of the present invention.

FIG. 16 shows $(w_k \cdot s_k)$ values that have been calculated by using the numerical values shown in Table 1 and also shows relationships between the $(w_k \cdot s_k)$ values and the common instruction values $\alpha$ in this preferred embodiment. In FIG. 16, the ordinate represents the $(w_k \cdot s_k)$ value and the abscissa represents the common instruction value $\alpha$.

On the other hand, the candidate common instruction values $\alpha_{ij}$ obtained by Equation (17) are shown in the following Table 2:

TABLE 2

| i | j | $\alpha_{ij}$ | $j(\alpha_{ij})$ |
|---|---|---|---|
| 1 | 2 | −0.035 | 0.238 |
| 1 | 3 | −0.131 | 0.265 |
| 1 | 4 | −0.225 | 0.340 |
| 2 | 3 | No need to calculate because $u_i$ and $u_j$ have the same sign | |
| 2 | 4 | | |
| 3 | 4 | | |

In Table 2, when the (i, j) combinations are (1, 2), (1, 3) and (1, 4), $u_i$ and $u_j$ have mutually opposite signs. Deriving the performance index for the $\alpha_{ij}$ obtained, it is found that the performance index $J(\alpha)$ is minimized when (i, j)=(1, 2). As can be seen from FIG. 16, a point at which the maximum values of respective $(w_k \cdot s_k)$ values reach their minimum value is point $Q_1$, which is in agreement with the computation result. Thus, the $\alpha$ value obtained (=−0.035) is output as the common instruction value. The computation procedure ends in this manner.

The effects of the common instruction value $\alpha$ obtained in this manner are compared with those achieved when the common instruction value $\alpha$ is zero. The following Table 3 shows the $(w_k \cdot s_k)$ values that have been calculated for two situation where $\alpha$=−0.035 and $\alpha$=0:

TABLE 3

| | | The ratio $(w_k \cdot s_k)$ of shortage to amplitude | | | | Estimation |
|---|---|---|---|---|---|---|
| | $\alpha$ | $w_1 \cdot s_1$ | $w_2 \cdot s_2$ | $w_3 \cdot s_3$ | $W_4 \cdot s_4$ | Function |
| No correction | 0.000 | 0.33 | 0.25 | 0.00 | −0.67 | |
| Point $Q_1$ | −0.035 | 0.29 | 0.29 | 0.05 | −0.55 | (Eq. 16) |
| Point $Q_2$ | −0.009 | 0.32 | 0.26 | 0.01 | −0.64 | (Eq. 19) m = 2 |

TABLE 3-continued

| | | The ratio $(w_k \cdot s_k)$ of shortage to amplitude | | | | Estimation |
|---|---|---|---|---|---|---|
| | $\alpha$ | $w_1 \cdot s_1$ | $w_2 \cdot s_2$ | $w_3 \cdot s_3$ | $W_4 \cdot s_4$ | Function |
| Point $Q_3$ | −0.030 | 0.30 | 0.29 | 0.04 | −0.57 | (Eq. 19) m = 4 |

Where the common instruction value $\alpha$ is not corrected (i.e., when $\alpha$=0), the output shortage at the coil k=1 is $(w_1 \cdot s_1)$=0.33. That is to say, the output shortage is 33% with respect to the amplitude of 0.9 of the voltage instruction value $u_1$. The output shortage at the coil k=2 is $(w_2 \cdot s_2)$=0.25. That is to say, the output shortage is 25% with respect to the amplitude of 0.8 of the voltage instruction value $u_2$.

On the other hand, where $\alpha$=−0.035, the output shortages at the coils k=1 and k=2 are both 0.29. Thus, the output shortages are 29% with respect to the amplitudes of the voltage instruction values $u_1$ and $u_2$. That is to say, if the drive voltage of the coil k=1 is supplemented with those of the other coils k=2 and k=3, the shortage at the coil k=1 can be substantially equalized with the shortage at the coil k=2.

In the computation method described above, $\alpha$ is defined in such a manner as to minimize the performance index $J(\alpha)$ given by Equation (16). Next, a performance index to minimize the sum of squared output shortages will be described. The sum of squared output shortages corresponds to the sum of deficient energies. Thus, if outputs are short of the required levels at multiple coils at the same time, the total quantity of deficient energy is minimized to drive the coils as stably as possible. More specifically, a common instruction value $\alpha$, which minimizes the performance index given by the following Equation (19) that is represented by using the positive value function given by the following Equation (18), is calculated:

$$f(x) = \begin{cases} 0, (x < 0) \\ x, (x \geq 0) \end{cases} \quad (18)$$

$$J(\alpha) = \sqrt[m]{\sum_k \{f(s_k)\}^m}, (2 \leq m \in R) \quad (19)$$

where m is an appropriate positive number and a parameter that may be defined appropriately by the designer. In this example, m is supposed to be 2. Other situation where m≠2 will be described later.

The $\alpha$ value that minimizes the performance index J given by Equation (19) is computed by a search method. The search may be carried out by a known method and the description thereof will be omitted herein. The initial search value is preferably selected by Equation (16). This is because the search can be started efficiently from a point close to the solution. Also, the solution often exists in the vicinity of $\alpha$=0. Accordingly, it would be even more efficient to perform the initial search toward $\alpha$=0.

Figure 17:
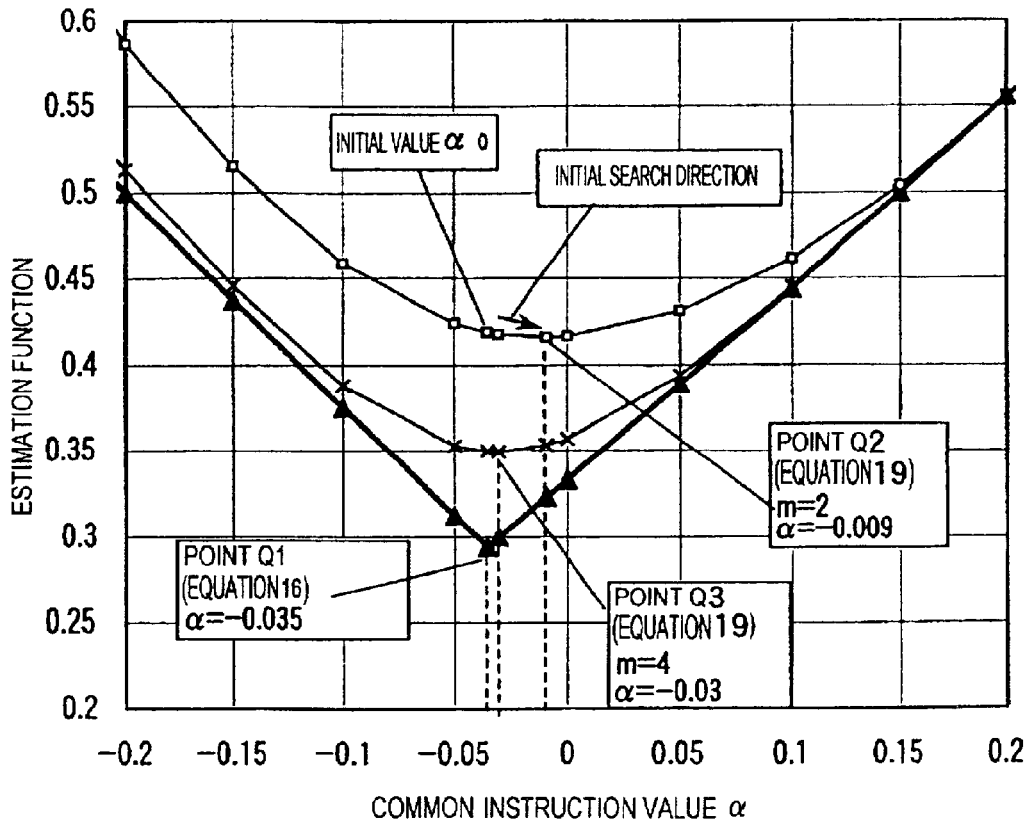
FIG. 17 is a graph showing relationships between the common instruction value α and performance indices in the circuit element driver of the fourth preferred embodiment.
Figure 18:
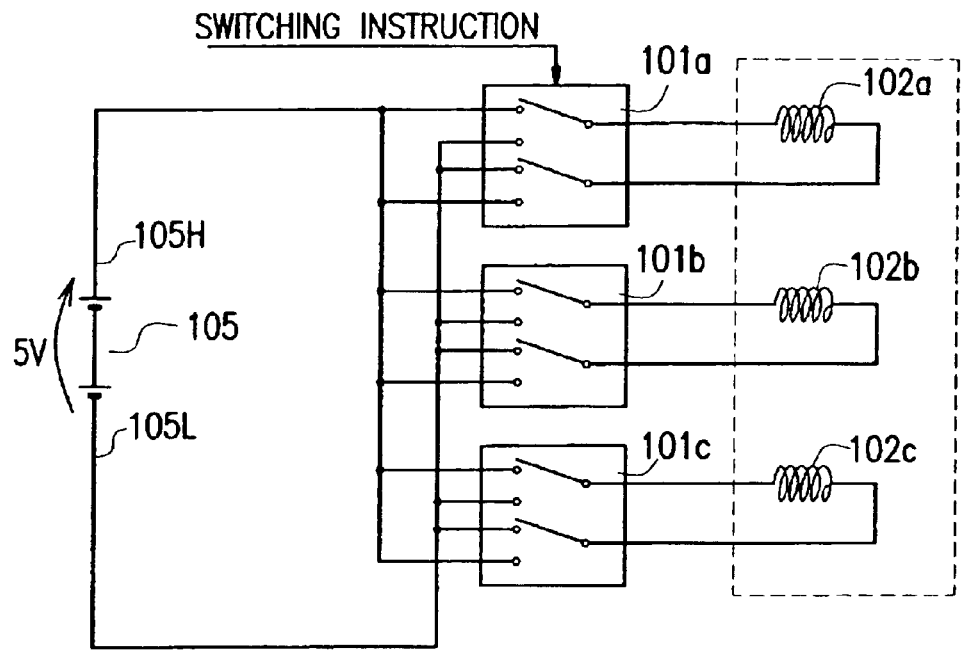
FIG. 18 is a circuit diagram illustrating a conventional method of driving two-terminal circuit elements.
Figure 19:
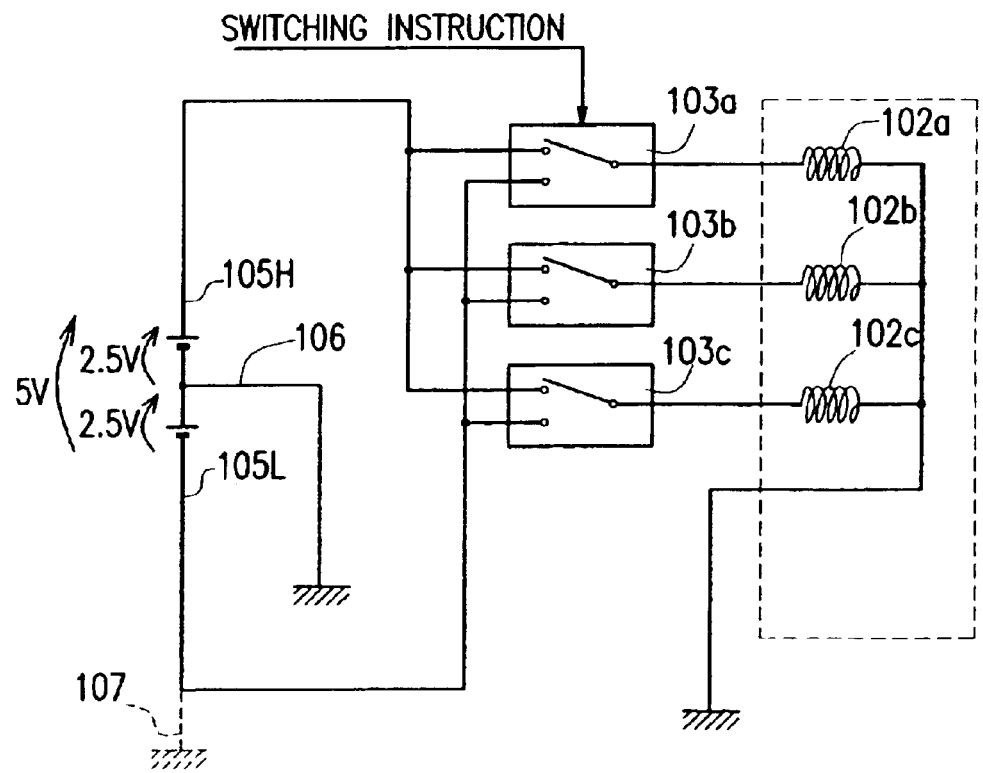
FIG. 19 is a circuit diagram illustrating another conventional method of driving two-terminal circuit elements.

The computation results of the performance index defined by Equation (19) will be described with reference to Table 3 and FIG. 17. FIG. 17 shows relationships between the common instruction values $\alpha$ and the values of the performance indices. In FIG. 17, the abscissa represents the common instruction value $\alpha$ and the ordinate represents the value of the performance index $J(\alpha)$. The solid triangles (▲) plot the values of the performance index defined by Equation (16). As shown in FIG. 17, the performance index is minimized at the point $Q_1$. The open squares (□) plot the values of the performance index defined by Equation (19) in which m=2. As shown in FIG. 17, the performance index is minimized at the point $Q_2$, where $\alpha=-0.009$. If this $\alpha$ value is output as the common instruction value, the sum of the deficient energy is minimized, thus further stabilizing the system.

The crosses (X) plot the values of the performance index defined by Equation (19) in which m=4. As shown in FIG. 17, the performance index is minimized at the point $Q_3$, where $\alpha=-0.03$. Comparing the respective performance indices plotted with each other, it can be seen that as the parameter m increases, Equation (19) is getting more and more asymptotic to Equation (16). This is because the performance index defined by Equation (19) is obtained by extending Equation (16). Comparing the results obtained for the point $Q_1$ ($\alpha=-0.035$), point $Q_2$ ($\alpha=-0.009$) and point $Q_3$ ($\alpha=-0.03$) by reference to Table 3, it can be seen that the output shortage value $s_k$ at the point $Q_3$ lies between the output shortage values $s_k$ at the points $Q_1$ and $Q_2$. That is to say, by appropriately determining the m value, either minimization of the output shortage values $s_k$ at the respective coils or minimization of the total quantity of deficient energy may be respected. As described above, according to this preferred embodiment, if the output shortages are created, the common instruction value $\alpha$ is determined in accordance with Equation (16) or (19), thereby minimizing the unwanted effects on the system even when the output shortage value at a particular coil is outstandingly great than any other coil.

The circuit element drivers according to the first through fourth specific preferred embodiments of the present invention described above are used to drive the coils of a motor or the coils of a lens driver. However, various other types of circuit elements may also be driven by the circuit element driver according to any of the preferred embodiments described above.

For example, the circuit element driver according to any of the preferred embodiments of the present invention described above can be used effectively to drive a jointed-arm robot including multiple motors. In a jointed-arm robot, the number of motors embedded needs to be greater than the degree of freedom of the arms thereof. Thus, a large number of interconnecting wires should be connected to the motors. On the other hand, the motors of a jointed-arm robot require a lot of torque, and therefore, the voltages applied to those motors cannot be decreased. However, if the circuit element driver according to any of the preferred embodiments of the present invention described above is used in that situation, the number of interconnecting wires can be reduced without decreasing the voltages to be applied. The control methods according to the preferred embodiments of the present invention are effectively applicable not only to such a jointed-arm robot but also to various other fields.

The circuit element driver according to any of the preferred embodiments of the present invention described above can independently drive multiple circuit elements, including a common terminal to reduce the number of interconnecting wires required, without decreasing the maximum instantaneous voltage that can be applied to each of those circuit elements. In addition, the circuit element driver can also redistribute power to circuit elements of which the outputs would be short of their required levels otherwise. Particularly when the overall output is insufficient, the circuit element driver can change the ratio of electrical power supplied to the circuit elements in such a manner as to minimize the unwanted effects on the driver. Specifically, when the circuit element driver needs to drive the three coils of a lens driver independently, the number of terminals required can be four. Accordingly, the unwanted effects on conductive elastic members that support a lens thereon can be substantially eliminated without providing any additional wire. Furthermore, the man-hour needed to establish the interconnection can also be reduced.

Furthermore, in producing an instruction value for a driving section in accordance with an input instruction value, the instruction value for the driving section can have its norm minimized, thus reducing the possibility of output saturation advantageously. Also, the instruction value can be calculated at a high speed by a linear matrix calculating section consisting of multipliers and adders only.

Moreover, the circuit element driver according to the preferred embodiments described above can perform non-linear computation to obtain the output shortages at the driving section, thus avoiding the output saturation of the driving section advantageously. Furthermore, the circuit element driver can estimate the output shortages by using an performance index that has been arbitrarily weighted by the designer, thereby specifying the re-distribution of the electrical power just as intended. Accordingly, by selecting an appropriate performance index, the circuit element driver may minimize either the output shortages at respective circuit elements or the total quantity of deficient energy. Also, the circuit element driver can efficiently obtain a common instruction value $\alpha$ that minimizes the performance index.

Furthermore, the circuit element driver according to any of the preferred embodiments of the present invention described above may also be used to drive a spindle motor. Compared to a situation where the common terminal is fixed at a constant voltage level, the circuit element driver can drive the spindle motor with a current that has had its wave height increased by about 16%. Moreover, in driving circuit elements with a periodical signal (e.g., in driving a spindle motor), the common instruction value and other instruction values may be stored in a memory, for example. In that case, the size of the calculating section and the time and power to be consumed to perform the computation can be all reduced.

Also, according to the preferred embodiments of the present invention described above, a number (n+1) of driver circuits need to be prepared to drive a number n of circuit elements. Thus, compared to the conventional circuit element driver that needs a number 2n of driver circuits in such a situation, a circuit to be provided for each of the circuit elements to be driven can have a simpler configuration. Furthermore, when a switching instruction is given through an I/O port of a DSP or microcomputer, the number of bits needed to drive a number n of coils may be only (n+1).

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A circuit element driver comprising:
   control means, which receives a number n of instruction values of a first group (where n is an integer equal to or greater than two) and produces and outputs a number p of instruction values of a second group (where p is an integer equal to or greater than (n+1) but less than 2n) in accordance with the n instruction values of the first group, the instruction values of the first group being issued to generate voltages to be applied to n two-terminal circuit elements; and driving means for generating and outputting p drive voltages in accordance with the p instruction values of the second group, wherein at least one of the p drive voltages changes with at least one of the instruction values of the first group and is applied in common to two or more of the circuit elements at one terminal thereof.

2. The circuit element driver of claim 1, wherein the control means defines the instruction values of the second group in such a manner as to substantially minimize a performance index about the drive voltages.

3. The circuit element driver of claim 1, wherein the control means produces the instruction values of the second group in such a manner as to substantially minimize differences between the voltages to be applied to the circuit elements in accordance with the instruction values of the first group and the drive voltages generated by the driving means.

4. The circuit element driver of claim 1, wherein the control means comprises linear matrix calculating means.

5. The circuit element driver of claim 4, wherein the linear matrix calculating means multiplies the n instruction values of the first group by a generalized inverse matrix having a size of p×n, thereby outputting the p instruction values of the second group.

6. The circuit element driver of claim 5, wherein the generalized inverse matrix minimizes a norm of the instruction values of the second group.

7. The circuit element driver of claim 5, wherein the generalized inverse matrix minimizes a norm of the instruction values of the second group that have been multiplied by a weighting factor.

8. The circuit element driver of claim 7, wherein the control means changes the weighting factor in accordance with a history of the instruction values of the first group.

9. The circuit element driver of claim 7, wherein the weighting factor is determined by using a norm about time of the instruction values of the first group.

10. The circuit element driver of claim 1, wherein n is three, p is four, and one of the four drive voltages is applied in common to the three two-terminal circuit elements at one terminal thereof.

11. The circuit element driver of claim 1, wherein p is an integer greater than n by one, and wherein the driving means generates a number (n+1) of drive voltages to be applied to a common terminal and n individual terminals, respectively, one terminal of each of the n circuit elements being connected to the common terminal, the other terminal of each said circuit element being associated one of the individual terminals, and wherein the control means receives the n instruction values of the first group and outputs (n+1) instruction values of the second group to the driving means so that the driving means generates the (n+1) drive voltages.

12. A circuit element driver comprising:

control means, which receives a number n of instruction values of a first group (where n is an integer equal to or greater than two) and produces and outputs a number p of instruction values of a second group (where p is an integer equal to or greater than (n+1) but less than 2n) in accordance with the n instruction values of the first group, the instruction values of the first group being issued to generate voltages to be applied to n two-terminal circuit elements; and driving means for generating and outputting p drive voltages in accordance with the p instruction values of the second group, wherein the control means produces one of the instruction values of the second group which corresponds to the drive voltage to be applied to a common terminal formed by commonly connecting terminals of two or more of the circuit elements, in accordance with at least one of the instruction values of the first group.

13. The circuit element driver of claim 12, wherein the control means produces other instruction values of the second group which corresponds to the drive voltages to be applied to respective individual terminals that are not connected to the common terminal of the two or more of the circuit elements, in accordance with the at least one instruction value of the first group.

14. A disk drive comprising:

the circuit element driver as recited in claim 1, and a lens driver that includes an objective lens, a tracking coil, a focus coil and a tilt coil.

15. The disk drive of claim 14, further comprising:

a conductive elastic member, which is connected in common to the tracking, focus and tilt coils at one terminal thereof; and three conductive elastic members, which are respectively connected to the tracking, focus and tilt coils at the other terminal thereof.

16. A method for driving a number n of two-terminal circuit elements in accordance with n instruction values, where n is an integer equal to or greater than two, the method comprising the steps of:

a) generating n drive voltages and one common drive voltage, the n drive voltages changing in accordance with the n instruction values, the common drive voltage changing in accordance with at least one of the n instruction values;

b) applying the common drive voltage in common to the n circuit elements at one terminal thereof; and c) applying the n drive voltages to the n circuit elements, respectively, at the other terminal thereof.

17. The method of claim 16, wherein the step a) comprises the step of determining the n drive voltages and the common drive voltage in such a manner as to substantially minimize a difference between the drive voltage to be applied to each said circuit element in accordance with associated one of the instruction values and a potential difference created between the two terminals of the circuit element.

18. The circuit element driver of claim 1, wherein the driving means comprises:

p duty changing means, each outputting a switching signal that changes its duty cycle in accordance with an associated one of the instruction values of the second group; and p switching driving means, each alternately outputting a maximum value or a minimum value of a supply voltage in response to associated one of the switching signals.

19. The circuit element driver of claim 18, wherein the duty changing means comprises a microcomputer or a digital signal processor (DSP) and outputs a signal, which has its bits at an input/output port inverted periodically through software-based timer processing using the microcomputer or the DSP, to the switching driving means.

20. The circuit element driver of claim 1, wherein each said instruction value of the first group is a periodic signal, and wherein at least one of the instruction values of the second group, which has been obtained beforehand through computation, is stored in a predetermined storage medium and is read out from the storage medium, and output to the driving means, synchronously with the instruction value of the first group.

21. The circuit element driver of claim 11, wherein each said circuit element is identified by a number k, which is an integer falling within a range from one to n, and
wherein the control means comprises:
maximum value detecting means for detecting a maximum value $u_{max}$ of the n instruction values $u_k$ of the first group; and
minimum value detecting means for detecting a minimum value $u_{min}$ of the n instruction values $u_k$ of the first group, and
wherein the control means produces the instruction value α of the second group by using at least the $u_{max}$ and the $u_{min}$, the instruction value α being used to generate the drive voltage to be applied to the common terminal, and
wherein the control means adds the instruction value α of the second group to each of the n instruction values $u_k$ of the first group, thereby generating n instruction values $r_k$ of the second group to be applied to the respective individual terminals.

22. The circuit element driver of claim 21, wherein the control means outputs an inverted average of the maximum and minimum values $u_{max}$ and $u_{min}$ as the instruction value α of the second group.

23. The circuit element driver of claim 11, wherein the driving means comprises a nonlinear function that has a non-saturated range in which the drive voltages are generated in proportion to the instruction values of the second group and a saturated range in which a constant drive voltage is generated irrespective of the instruction values of the second group, and
wherein the control means calculates the (n+1) instruction values of the second group from the n instruction values of the first group in accordance with a nonlinear relationship, and
wherein each said circuit element is identified by a number k, which is an integer falling within a range from one to n, and
wherein the control means comprises output shortage calculating means for providing surpluses of the n instruction values $u_k$ of the first group over the non-saturated range as n output shortages $s_k$ if the (n+1) instruction values of the second group are greater than a maximum value of the non-saturated range or smaller than a minimum value of the non-saturated range, and
wherein the control means produces the instruction value α of the second group to be supplied to the common terminal by using at least one of the n output shortages $s_k$, and produces the n instruction values $r_k$ of the second group to be supplied to the individual terminals by adding the instruction value α of the second group to each of the n instruction values $u_k$ of the first group.

24. The circuit element driver of claim 23, wherein the control means uses a performance index that includes the n output shortages $s_k$ as respective arguments and determines the instruction value α of the second group in such a manner as to minimize the performance index.

25. The circuit element driver of claim 24, wherein the performance index is used to output a maximum value of the output shortages $s_k$.

26. The circuit element driver of claim 24, wherein the performance index has been weighted by a weighting factor $w_k$.

27. The circuit element driver of claim 25, wherein the instruction value α of the second group is determined by performing the steps of:
obtaining multiple candidates $\alpha_{ij}$ of the instruction value α of the second group by a predetermined equation that uses an instruction value $u_i$ of the first group of an $i^{th}$ one of the circuit elements and an instruction value $u_j$ of the first group of a $j^{th}$ one of the circuit elements, $u_i$ and $u_j$ having mutually opposite signs; and
selecting one of the candidates $\alpha_{ij}$, which minimizes the performance index, as the instruction value α of the second group.

28. The circuit element driver of claim 27, wherein the predetermined equation for obtaining the candidates $\alpha_{ij}$ is represented as $$\alpha_{ij} = \frac{q(w_i - w_j) - (w_i |u_i| - w_j |u_j|)}{(w_i sgn(u_i) - w_j sgn(u_j))}, (i \neq j \wedge sgn(u_i) sgn(u_j) = -1)$$

by using the weighting factor $w_k$, a predetermined constant q and a signum function sgn(x) defined by $$sgn(x) = \begin{cases} -1, (x < 0) \\ 0, (x = 0) \\ 1, (x > 0) \end{cases}.$$

29. The circuit element driver of claim 26, wherein the instruction value α of the second group is determined by performing the steps of:
obtaining multiple candidates $\alpha_{ij}$ of the instruction value α of the second group by a predetermined equation that uses an instruction value $u_i$ of the first group of an $i^{th}$ one of the circuit elements and an instruction value $u_j$ of the first group of a $j^{th}$ one of the circuit elements, $u_i$ and $u_j$ having mutually opposite signs; and
selecting one of the candidates $\alpha_{ij}$, which minimizes the performance index, as the instruction value α of the second group.

30. The circuit element driver of claim 29, wherein the predetermined equation for obtaining the candidates $\alpha_{ij}$ is represented as $$\alpha_{ij} = \frac{q(w_i - w_j) - (w_i |u_i| - w_j |u_j|)}{(w_i sgn(u_i) - w_j sgn(u_j))}, (i \neq j \wedge sgn(u_i) sgn(u_j) = -1)$$

by using the weighting factor $w_k$, a predetermined constant q and a signum function sgn(x) defined by $$sgn(x) = \begin{cases} -1, (x < 0) \\ 0, (x = 0) \\ 1, (x > 0) \end{cases}.$$

31. The circuit element driver of claim 24, wherein a norm of the output shortages $s\alpha_k$ is used for the performance index.

32. The circuit element driver of claim 31, wherein the instruction value α of the second group is determined by performing the steps of:
obtaining multiple initial value candidates $\alpha_{ij}$ by a predetermined equation that uses an instruction value $u_i$ of the first group of an $i^{th}$ one of the circuit elements and an instruction value $u_j$ of the first group of a $j^{th}$ one of the circuit elements, $u^i$ and $u^j$ having mutually opposite signs;

selecting an initial value $\alpha_0$ that minimizes the performance index from the initial value candidates $\alpha_{ij}$ by a first iterative procedure; and searching for the instruction value $\alpha$ of the second group that minimizes the performance index by a second iterative procedure that starts at the initial value $\alpha_0$ and uses $\alpha=0$ as an initial search direction.

33. The circuit element driver of claim 23, wherein the control means further comprises:

maximum value detecting means for detecting a maximum value $S_{max}$ of the n output shortages $s_k$; and minimum value detecting means for detecting a minimum value $S_{min}$ of the n output shortages $s_k$, and wherein the control means produces the instruction value $\alpha$ of the second group to be supplied to the common terminal by using at least the maximum and minimum values $S_{max}$ and $S_{min}$.

34. The circuit element driver of claim 33, wherein an inverted sum of the maximum and minimum values $S_{max}$ and $S_{min}$ is output as the instruction value $\alpha$ of the second group.

35. The method of claim 16, wherein the step a) comprises the step of generating the common drive voltage from maximum and minimum values of the n instruction values.

* * * * *